US012772177B2

(12) United States Patent
He et al.

(10) Patent No.: US 12,772,177 B2
(45) Date of Patent: Oct. 20, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventors: Chuanfeng He, Dongguan (CN); Weijie Xu, Dongguan (CN); Zhisong Zuo, Dongguan (CN); Zhi Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 311 days.

(21) Appl. No.: 18/434,075

(22) Filed: Feb. 6, 2024

(65) Prior Publication Data

US 2024/0179639 A1 May 30, 2024

Related U.S. Application Data

(63) Continuation of application No. PCT/CN2021/112616, filed on Aug. 13, 2021.

(51) Int. Cl.
*H04W 52/24* (2009.01)

(52) U.S. Cl.
CPC ....... *H04W 52/242* (2013.01); *H04W 52/245* (2013.01)

(58) Field of Classification Search
CPC ............. H04W 52/242; H04W 52/245; H04W 52/146
See application file for complete search history.

(56) References Cited

U.S. PATENT DOCUMENTS

| | | | | |
|---|---|---|---|---|
| 9,232,475 | B2 * | 1/2016 | Heinzelman | H04W 52/0229 |
| 9,754,139 | B2 * | 9/2017 | Chemishkian | H02J 50/20 |
| 2011/0081927 | A1 | 4/2011 | Gerstenberger et al. | |
| 2013/0241705 | A1 | 9/2013 | Rodriguez et al. | |
| 2017/0193256 | A1 | 7/2017 | Jung et al. | |
| 2018/0302862 | A1 | 10/2018 | Takata et al. | |

(Continued)

FOREIGN PATENT DOCUMENTS

| | | | | |
|---|---|---|---|---|
| CN | 109547183 A | | 3/2019 | |
| CN | 111447662 A | * | 7/2020 | H04W 72/53 |

(Continued)

OTHER PUBLICATIONS

European Search Report in European Patent Application No. 21953185.2, mailed on Aug. 23, 2024 (9 pages).

(Continued)

*Primary Examiner* — Curtis A Kuntz
(74) *Attorney, Agent, or Firm* — Ladas & Parry, LLP

(57) ABSTRACT

Disclosed are a wireless communication method and a device. The method includes: determining, by a first terminal, a target transmitting power at which the first terminal transmits a back-scattering signal based on first information, wherein the first information comprises at least one of: a receiving power of a first signal, the first signal being configured to power the first terminal and/or generate the back-scattering signal; a target receiving power expected by a receiving end of the back-scattering signal; a first power offset parameter, a power control command; and a back-scattering loss.

18 Claims, 8 Drawing Sheets

(56) References Cited

U.S. PATENT DOCUMENTS

| | | | | |
|---|---|---|---|---|
| 2020/0313939 | A1* | 10/2020 | Lopez | H04L 27/0006 |
| 2023/0199670 | A1* | 6/2023 | Zhang | H04W 52/16 455/522 |

FOREIGN PATENT DOCUMENTS

| | | | | |
|---|---|---|---|---|
| CN | 112399542 | A * | 2/2021 | H04B 5/20 |
| CN | 112926347 | A | 6/2021 | |
| WO | 2021031662 | A1 | 2/2021 | |
| WO | 2021043050 | A1 | 3/2021 | |
| WO | 2023015572 | A1 | 2/2023 | |

OTHER PUBLICATIONS

Arnitz, Daniel et al., "Multitransmitter Wireless Power Transfer Optimization for Backscatter RFID Transponders", IEEE Antennas and Wireless Propagation Letters, vol. 12, 2013, pp. 849-852.

"EPC™ Radio Frequency Identity Protocol Generation-2 UHF RFID Standard", Specification for RFID Air Interface Protocol for Communications at 860 MHz—960 MHZ, Release 2.1, Ratified, Jul. 2018.

3GPP TS 38.213 V16.2.0, 3rd Generation Partnership Project; Technical Specification Group Radio Access Network; NR; Physical layer procedures for control (Release 16) (Jun. 2020).

International Search Report for International Application No. PCT/CN2021/112616, mailed May 7, 2022, with English translation provided by WIPO.

Written Opinion of the International Searching Authority for International Application No. PCT/CN2021/112616, mailed May 7, 2022, with partial translation by the applicant's foreign counsel and machine English translation provided by WIPO.

First Office Action of the corresponding European patent application No. 21953185.2, issued on Nov. 19, 2025.

* cited by examiner

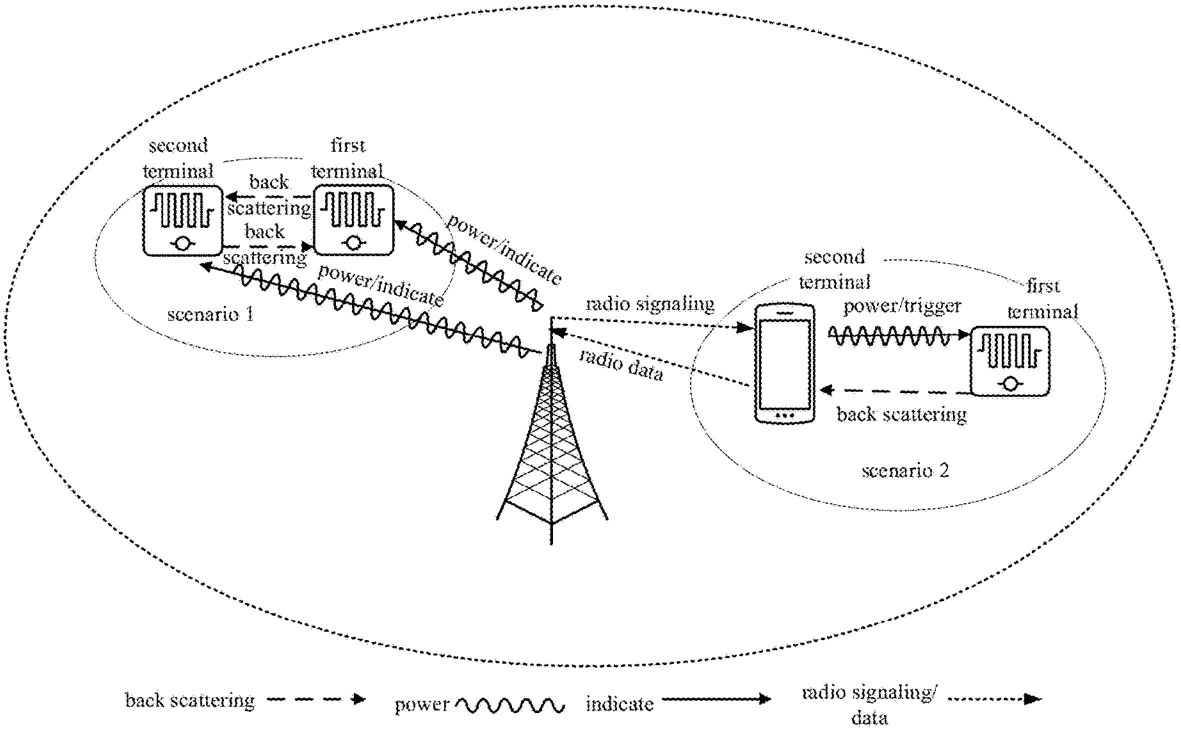

FIG. 10

300 the first device determines a transmitting power of a second signal, the second signal is configured for a first terminal to generate a back-scattering signal, or the second signal is the back-scattering signal of the first terminal

S310

FIG. 11

400 the network device transmits fourth information to a second terminal. The fourth information is configured to control a power of a first signal transmitted by the second terminal. The receiving end of the first signal is a first terminal. The first signal is configured to power the first terminal and/or configured for the terminal device to generate a back-scattering signal.

S410

FIG. 12

WIRELESS COMMUNICATION METHOD AND DEVICE

CROSS REFERENCE TO RELATED APPLICATIONS

The present disclosure is a continuation of International Patent Application No. PCT/CN2021/112616, filed on Aug. 13, 2021, entitled "WIRELESS COMMUNICATION METHOD AND DEVICE", the content of which is herein incorporated by reference in its entirety.

TECHNICAL FIELD

Embodiments of the present disclosure relate to the communication technical field, and more specifically, to a wireless communication method and a wireless communication device.

BACKGROUND

In wireless communication systems, power control is widely used. Main functions of the power control include: compensating a path loss and shadow fading in a channel, suppressing inter-cells with the same frequency and inter-user interferences, and ensuring a network coverage and a system capacity.

Zero power-consumption communication needs to meet a certain coverage range, which is usually from tens or even hundreds of meters. In addition, there are also high requirements for a transmitting power of the zero power-consumption terminal and the resulted interference. At this time, how to perform the power control to give consideration to both link quality and interference on other devices is an urgent problem to be solved.

SUMMARY

In a first aspect, a wireless communication method is provided. The wireless communication method includes: determining, by a first terminal, a target transmitting power at which the first terminal transmits a back-scattering signal based on first information, wherein the first information includes at least one of: a receiving power of a first signal, the first signal being configured to power the first terminal and/or generate the back-scattering signal; a target receiving power expected by a receiving end of the back-scattering signal; a first power offset parameter; a power control command; and a back-scattering loss.

In a second aspect, network device, comprising a processor and a memory, wherein the memory is configured to store a computer program, the processor is configured to call and run the computer program stored in the memory and execute transmitting third information to a terminal device, wherein the third information is configured to control a power at which the terminal device transmits a back-scattering signal.

In a third aspect, a wireless communication device is provided. The wireless communication device includes a processor and a memory. The memory is configured to store a computer program, the processor is configured to call and run the computer program stored in the memory and execute: determining a target transmitting power at which the wireless communication device transmits a back-scattering signal based on first information, wherein the first information comprises at least one of: a receiving power of a first signal, the first signal being configured to power the wireless communication device and/or generate the back-scattering signal; a target receiving power expected by a receiving end of the back-scattering signal; a first power offset parameter; a power control command; and a back-scattering loss.

BRIEF DESCRIPTION OF THE DRAWINGS

FIG. 10 is a schematic view of another scenario to which embodiments of the present disclosure are applied.

FIG. 11 is a schematic flow chart of another wireless communication method according to some embodiments of the present disclosure.

FIG. 12 is a schematic flow chart of yet another wireless communication method according to some embodiments of the present disclosure.

DETAILED DESCRIPTIONS

Figure 1:
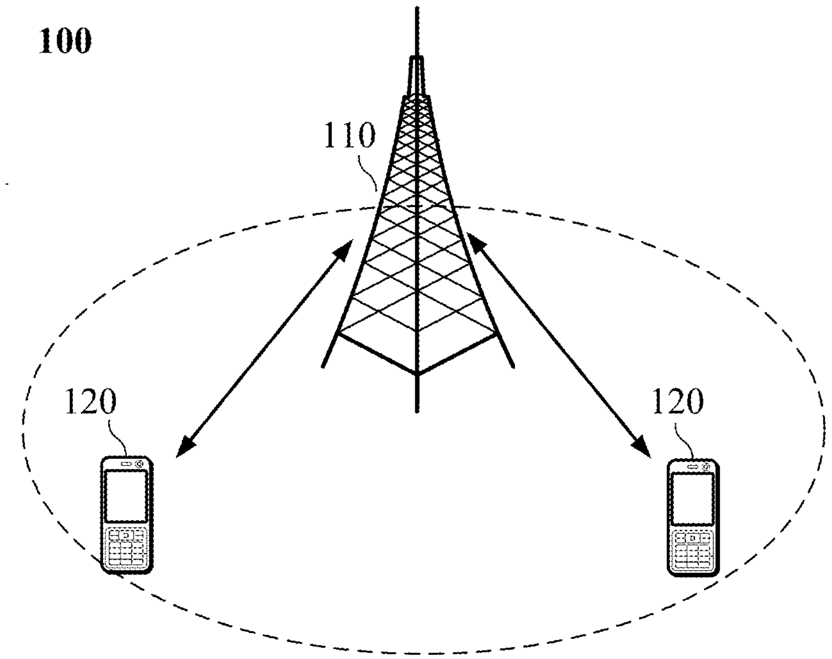
FIG. 1 is a schematic view of a communication system architecture according to some embodiments of the present disclosure.

The technical solutions in embodiments of the present disclosure will be described below with reference to the drawings in embodiments of the present disclosure. Obviously, the described embodiments are part of the embodiments of the present disclosure, but not all of the embodiments. With regard to the embodiments in the present disclosure, all other embodiments obtained by those skilled in the art without making creative efforts belong to the protection scope of the present disclosure.

Technical solutions of the embodiments of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, a LTE-based access to unlicensed spectrum (LTE-U) system, a NR-based access to unlicensed spectrum (NR-U) system, a Non Terrestrial Networks (NTN) system, a Universal Mobile Telecommunications System (UMTS), a Wireless Local Area Networks (WLAN), a Wireless Fidelity (WiFi), a 5th-Generation (5G) system, a cellular Internet of Things system, a cellular passive Internet of Things system, or other communication systems, etc.

Generally speaking, traditional communication systems support a limited number of connections and are easy to be implemented. However, with the development of communication technologies, mobile communication systems will not only support traditional communications, but also support, for example, Device to Device (Device to Device, D2D) communication, Machine to Machine (M2M) communication, Machine Type Communication (MTC), Vehicle to Vehicle (V2V) communication, or Vehicle to everything (V2X) communication, etc. The embodiments of the present disclosure may be applied to these communication systems.

The communication systems in the embodiments of the present disclosure may be applied to a Carrier Aggregation (CA) scenario, may also be applied to a Dual Connectivity (DC) scenario, and may also be applied to a standalone (SA) network deployment scenario.

The communication system in the embodiments of the present disclosure may be applied in an unlicensed spectrum. The unlicensed spectrum may also be considered as a shared spectrum. Alternatively, the communication system in the embodiments of the present disclosure may also be applied in a licensed spectrum. The licensed spectrum may also be considered as a non-shared spectrum.

The embodiments of the present disclosure are described in combination with a terminal device and a network device. The terminal device may also be called User Equipment (UE), access terminal, user unit, user station, mobile station, mobile platform, remote station, remote terminal, mobile device, user terminal, terminal, wireless communication device, user agent, user devices, and so on.

In some embodiments of the present disclosure, the network device may be a device configured to communicate with a mobile device. The network device may be an access point (AP) in the WLAN, a Base Transceiver Station (BTS) in the GSM or CDMA, a Node B (NB) in the WCDMA, an Evolutional Node B (eNB or eNodeB) in the LTE, a relay station or an access point, an on-board device, a wearable device, a next generation Node B (gNB) in the NR network, a network device in a cellular Internet of Things system, a network device in a cellular passive Internet of Things system, a network device in the future evolution PLMN network, or a network device in a NTN network, etc.

By way of example and not limitation, in the embodiments of the present disclosure, the network device may have mobile characteristics. For example, the network device may be a mobile device. For example, the network device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. For example, the network device may also be a base station deployed on land, or water, etc.

In the embodiments of the present disclosure, the network device provides services for a cell, and the terminal device communicates with the network device through transmitting resources (such as frequency-domain resources, or spectrum resources) used by the cell. The cell may be a cell corresponding to the network device (such as a base station). The cell may belong to a macro base station or a base station corresponding to a small cell. The small cell herein may include: a metro cell, a micro cell, a pico cell, a femto cell, etc. These small cells have the characteristics of small coverage and low transmitting power and are suitable for providing high-speed data transmitting services.

The terminal device may be a station (ST) in WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device, or other processing device connected to a wireless modem, a vehicle-mounted device, a wearable device, or a terminal device in a next-generation communication system, such as a terminal device in a NR network, or a terminal device in a future evolved PLMN network, a network device in a cellular Internet of Things system, or a network device in a cellular passive Internet of Things system, etc.

In the embodiments of the present disclosure, the terminal device may be deployed on land, including indoor or outdoor, handheld, wearable or vehicle-mounted. Alternatively, the terminal device may be deployed on water (such as on ships, etc.). Alternatively, the terminal device may be deployed in the air (such as on aircrafts, balloons, and satellites, etc.).

In the embodiments of the present disclosure, the terminal device may be a mobile phone, a tablet computer (Pad), a computer with wireless transceiving function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in the embodiments of the present disclosure, the terminal device may also be a wearable device. The wearable device may also be referred to as a wearable smart device, which is a general term of wearable devices developed by applying wearable technology to perform intelligently design on daily wear, such as glasses, gloves, watches, clothing, and shoes. A wearable device is a portable device that is worn directly on the body or integrated into the users' clothes or accessories. The wearable device is not only a hardware device, but also may realize powerful functions through software support, data interaction, and cloud interaction. Generalized wearable smart devices include full-featured and large-sized devices which may realize complete or partial functions without depending on smart phones, such as smart watches or smart glasses, and devices that only focus on a certain type of application function and need to cooperate with other devices like smart phones, such as smart bracelets for sign monitoring, or smart jewelries.

Exemplarily, a communication system 100 to which the embodiments of the present disclosure are applied is shown in FIG. 1. The communication system 100 may include a network device 110, and the network device 110 may be a device configured to communicate with a terminal device 120 (which may also be referred to as a communication terminal, or terminal). The network device 110 may provide communication coverage for a specific geographical region and may communicate with terminal devices in the coverage region.

FIG. 1 exemplarily shows one network device and two terminal devices. In some embodiments, the communication system 100 may include multiple network devices and each network device may include other numbers of terminal devices within the coverage region, which are not limited by the embodiments of the present disclosure.

In some embodiments, the communication system 100 may further include other network entities such as a network controller, a mobility management entity, and so on, which is not limited in the embodiments of the present disclosure.

It should be understood that a device having a communication function in the network/system in the embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the aforementioned specific devices, which will not be repeated herein. The communication device may further include other devices in the communication system 100, such as other network entities like a network controller, a mobility management entity, and so on, which is not limited in the embodiments of the present disclosure.

It should be understood that, the terms "system" and "network" in the present disclosure are often used interchangeably. In the present disclosure, the term "and/or" is used to describe an associated relationship between associated objects. For example, there may be three types of relationships between the associated objects before and after. For example, A and/or B, may indicate three situations: A exists alone, A and B exists at the same time, and B exists alone. In the present disclosure, the character "/" may indicate that the relationship between the associated objects before and after is "or".

It should be understood that, "indication/indicate" mentioned in some embodiments of the present disclosure may be a direct indication, an indirect indication, or a representation of an associated relationship. For example, A indicates B, may indicate that A indicates B directly, for example, B may be obtained through A, may indicate that A indicates B indirectly, for example, A indicates C, and B may be obtained through C, and may also indicate that there is an associated relationship between A and B.

In the description of some embodiments of the present disclosure, the term "corresponding to" may indicate that there is a direct or indirect correspondence between two objects, may indicate that there is an associated relationship between two objects, or may indicate a relationship of indicating or being indicated, configuring or being configured, and so on.

In the embodiments of the present disclosure, "predefinition/predefined" may be realized by pre-saving a corresponding code, table, or other methods that may be configured to indicate related information in a device (for example, including a terminal device and a network device). The specific implementation method is not limited in the embodiments of the present disclosure. For example, predefinition/predefined may refer to being defined in a protocol.

In embodiments of the present disclosure, a "protocol" may refer to a standard protocol in the communication field, for example, it may include the LTE protocol, the NR protocol, or related protocols applied in future communication systems, which is not limited in the present disclosure.

In order to facilitate understanding of the technical solutions of the embodiments of the present disclosure, related technologies of the embodiments of the present disclosure are described below.

I. Zero Power-Consumption Communication

Zero power-consumption communication adopts technologies of power harvesting and back-scattering communication. The zero power-consumption communication network includes a network device and a zero power-consumption terminal.

Figure 2:
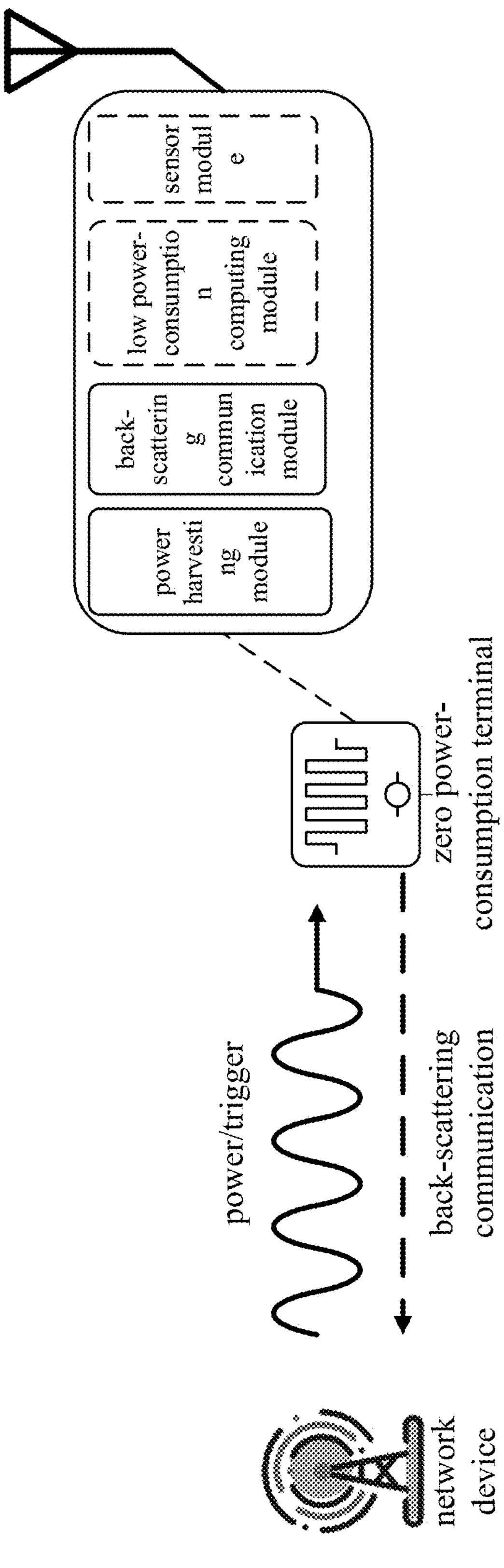
FIG. 2 is a schematic view of a zero power-consumption communication system according to some embodiments of the present disclosure.

As shown in FIG. 2, the network device is configured to transmit wireless power signals and downlink communication signals to the zero power-consumption terminal and receive back-scattering signals of the zero power-consumption terminal. A basic zero power-consumption terminal includes a power harvesting module, a back-scattering communication module, and a low power-consumption computing module. In addition, the zero power-consumption terminal may also include a memory configured to store some basic information (such as object identification), or a sensor configured to obtain sensing data, such as ambient temperature, and ambient humidity.

The key technologies in the zero power-consumption communication will be explained below.

1. Radio-Frequency Power Harvesting

Figure 3:
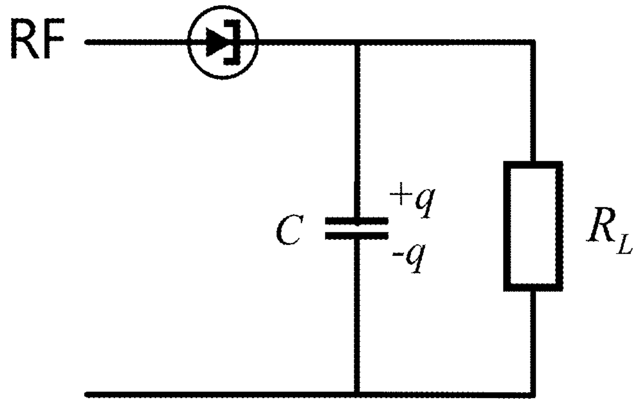
FIG. 3 is a schematic view of power harvesting.

As shown in FIG. 3, the radio-frequency power harvesting module realizes the harvesting of space electromagnetic-wave power based on the principle of electromagnetic induction, so as to obtain the power needed to drive the zero power-consumption terminal, such as driving a low power-consumption demodulation and modulation module, a sensor, a memory reading, etc. Therefore, the zero power-consumption terminal does not need a traditional battery.

2. Back-Scattering Communication

Figure 4:
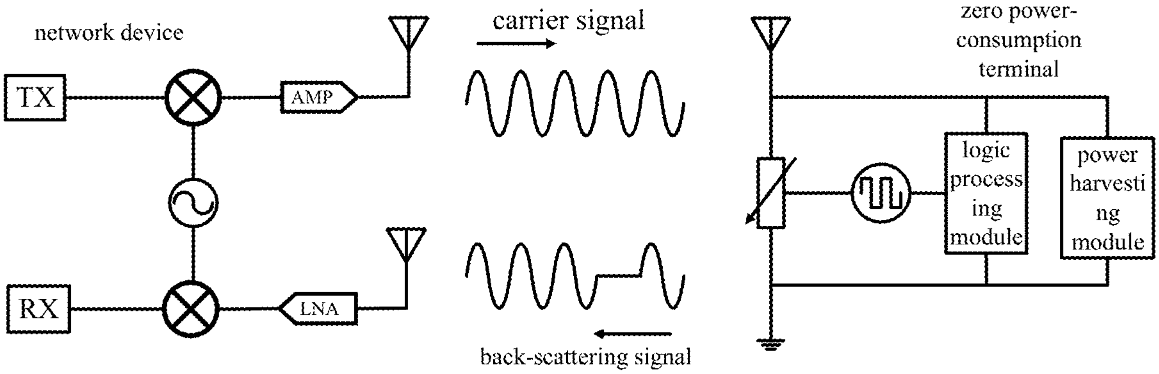
FIG. 4 is a schematic view of back-scattering communication.
Figure 5:
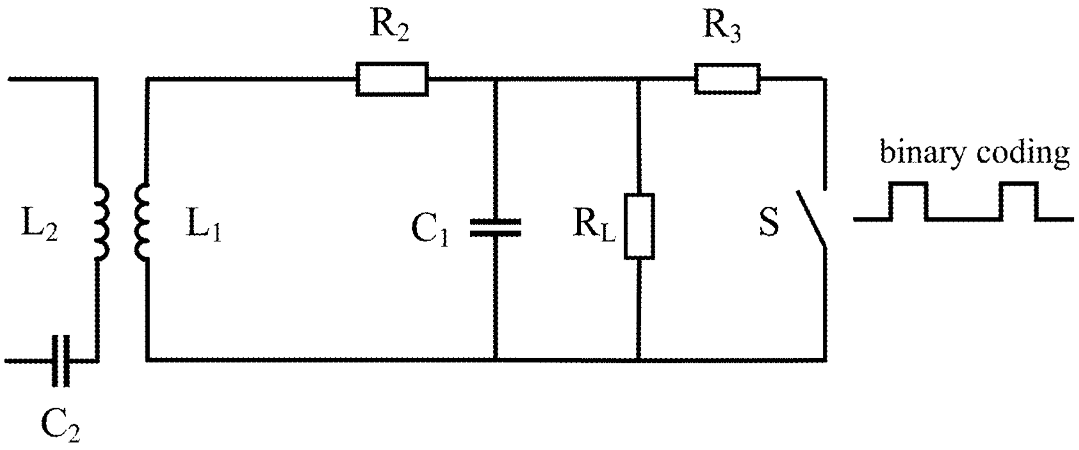
FIG. 5 is a schematic circuit view of a resistor load modulation.

As shown in FIG. 4, the zero power-consumption terminal receives a carrier signal transmitted by the network device, modulates the carrier signal, loads information to be transmitted, and radiates the modulated signal through an antenna. This information transmitting process is called back-scattering communication. Back-scattering and load modulation functions are inseparable. The load modulation adjusts and controls circuit parameters of an oscillation loop of the zero power-consumption terminal based on beats of data stream to change impedance of an electronic identification and other parameters accordingly, thereby completing a modulation process. The load modulation technology mainly includes resistor load modulation mode and capacitor load modulation mode. In the resistor load modulation, the load is connected in parallel with a resistor, which is controlled to be connection or disconnection based on binary data stream, as shown in FIG. 5. The connection or disconnection of the resistor will lead to the change of circuit voltage, and an Amplitude-Shift-Keying (ASK) modulation may be realized, that is, the modulation and transmission of signals are realized by adjusting the amplitude of the back-scattering signal of the zero power-consumption terminal. Similarly, in the capacitor load modulation, the change of circuit resonant frequency may be realized by controlling the capacitor to be connection or disconnection, and a Frequency-Shift-Keying (FSK) modulation may be realized, that is, the modulation and transmission of signals may be realized by adjusting the operating frequency of the back-scattering signal of the zero power-consumption terminal.

It may be seen that, the zero power-consumption terminal uses the load modulation mode to perform information modulation on the received signal, thereby realizing the back-scattering communication process. Therefore, the zero power-consumption terminal has the following significant advantages.

(1) The terminal does not actively transmit signals, and therefore does not need complex radio-frequency links, such as a power amplifier (PA), a radio-frequency filter, etc.

(2) The terminal does not need to actively generate high-frequency signals, and therefore does not need a high-frequency crystal oscillator.

(3) With the help of the back-scattering communication, the terminal does not need to consume its own power to perform signal transmission.

3. Coding Technology

The data transmitted by the electronic tag may be represented as binary "1" and "0" with different forms of codes. The wireless radio-frequency identification system usually uses one of the following coding methods: Non-Return Zero (NRZ) Inverted coding, Manchester coding, Unipolar Return Zero (Unipolar RZ) coding, Differential Bi-Phase (DBP) coding, differential coding Pulse Interval Encode (PIE), Bi-Phase Space (FM0) coding, and Miller coding. Generally speaking, different pulse signals are configured to represent 0 and 1.

In some scenarios, based on the power source and the using method of the zero power-consumption terminal, the zero power-consumption terminal may be divided into the following types.

1. Passive Zero Power-Consumption Terminal

The zero power-consumption terminal does not need an internal battery. When the zero power-consumption terminal is close to the network device, such as a reader-writer of a Radio-Frequency Identification (RFID) system, the zero power-consumption terminal is within a near-field range radiated by an antenna of the network device. Therefore, an antenna of the zero power-consumption terminal generates induced current through electromagnetic induction, and the induced current drives the low power-consumption chip circuit of the zero power-consumption terminal, thereby realizing demodulation of forward link signals and modulation of backward link signals. For the back-scattering link, the zero power-consumption terminal uses a back-scattering implementation method to transmit signals.

It may be seen that, the passive zero power-consumption terminal does not need an internal battery to drive the forward link and the backward link, and is a true zero power-consumption terminal.

The passive zero power-consumption terminal does not need a battery, and a radio-frequency circuit and a baseband circuit are very simple. For example, the passive zero power-consumption terminal does not need a low noise amplifier (LNA), a power amplifier (PA), a crystal oscillator, an analog digital converter (ADC), and other components, and therefore has many advantages such as a small size, a light weight, a cheap price, a long service life, etc.

2. Semi-Passive Zero Power-Consumption Terminal

The semi-passive zero power-consumption terminal does not install a conventional battery, and may use the radio-frequency power harvesting module to collect radio wave power, and store the collected power in a power-storage unit (such as a capacitor). After obtaining power, the power-storage unit may drive the low power-consumption chip circuit of the zero power-consumption terminal, thereby realizing demodulation of forward link signals and modulation of backward link signals. For the back-scattering link, the zero power-consumption terminal uses a back-scattering implementation method to transmit signals.

It may be seen that, the semi-passive zero power-consumption terminal does not need an internal battery to drive the forward link and the backward link. Although the power stored in the capacitor is used during work, the power comes from the radio power collected by the power harvesting module, therefore the semi-passive zero power-consumption terminal is also a true zero power-consumption terminal.

The semi-passive zero power-consumption terminal inherits many advantages of the passive zero power-consumption terminal, and has many advantages such as small size, a light weight, a cheap price, a long service life, etc.

3. Active Zero Power-Consumption Terminal

The zero power-consumption terminal used in some scenarios may also be an active zero power-consumption terminal which may have an internal battery. The battery is configured to drive the low power-consumption chip circuit of the zero power-consumption terminal, thereby realizing demodulation of forward link signals and modulation of backward link signals. For the back-scattering link, the zero power-consumption terminal uses a back-scattering implementation method to transmit signals. Therefore, the zero power-consumption of such terminals mainly lies in that the signal transmission of the backward link does not need the power of the terminal and uses the mode of back-scattering.

II. Cellular Passive Internet of Things

With the increase of 5G industry applications, there are more and more types and application scenarios of connectors, and there will be higher requirements for the cost and power-consumption of communication terminals. The application of battery-free, low-cost passive Internet of Things device becomes a key technology of the cellular Internet of Things, enriches the types and the number of 5G network link terminals, and truly realizes the interconnection of everything. Herein, the passive Internet of Things device may be based on a zero power-consumption communication technology, such as a RFID technology, and extended on this basis, so as to apply to the cellular Internet of Things.

In wireless communication systems, power control is widely used. Main functions of the power control include: compensating the path loss and shadow fading in a channel, suppressing inter-cells with the same frequency and inter-users interferences, and ensuring a network coverage and a system capacity.

Zero power-consumption communication needs to meet a certain coverage range, which is usually from tens or even hundreds of meters. In addition, there are also high requirements for a transmitting power of the zero power-consumption terminal and the resulted interference. At this time, how to perform the power control to give consideration to both link quality and interference on other devices is an urgent problem to be solved.

Technical solutions of the present disclosure are described in detail below through specific embodiments. The aforesaid related technologies serving as optional solutions may be combined with the technical solutions of the embodiments of the present disclosure in any manner, and all of such combinations fall within the protection scope of the embodiments of the present disclosure. The embodiments of the present disclosure include at least part of the following contents.

Figure 6:
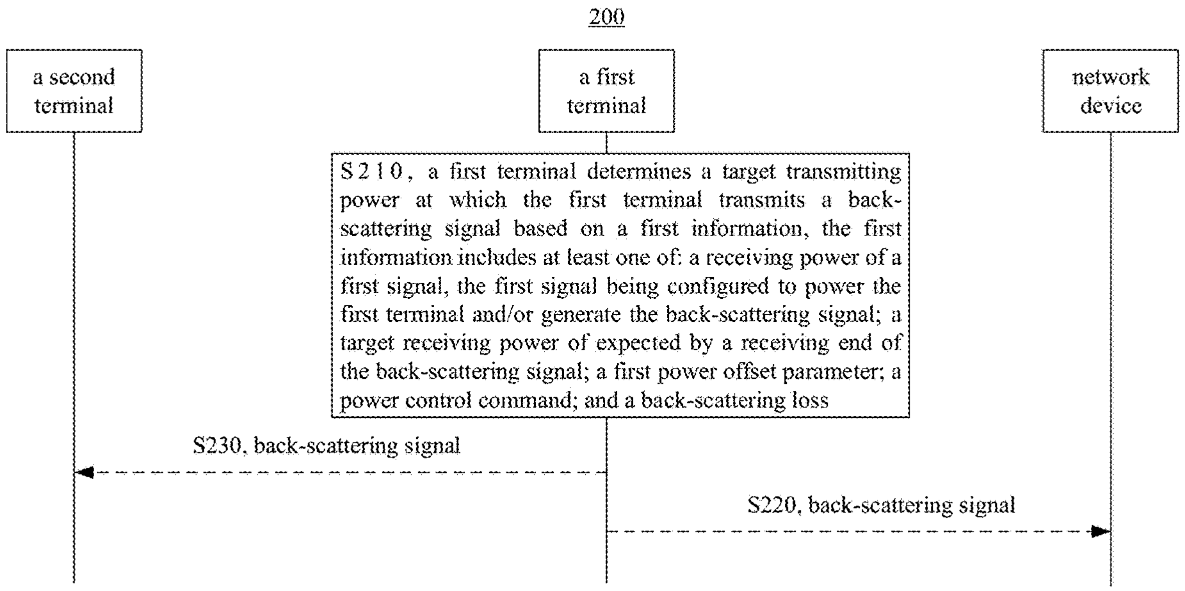
FIG. 6 is a schematic interaction view of a wireless communication method according to some embodiments of the present disclosure.

FIG. 6 is a schematic flow chart of a wireless communication method 200 according to some embodiments of the present disclosure. As shown in FIG. 6, the method 200 includes the following operations.

At S210, a first terminal determines a target transmitting power at which the first terminal transmits a back-scattering signal based on a first information, the first information includes at least one of:

a receiving power of a first signal, the first signal being configured to power the first terminal and/or generate the back-scattering signal;

a target receiving power of expected by a receiving end of the back-scattering signal;

a first power offset parameter;

a power control command; and a back-scattering loss.

In some embodiments of the present disclosure, the first terminal is a device, for example, a zero power-consumption terminal, which does not actively transmit signals and uses signals transmitted by a network device or other devices to carry information.

It should be understood that, some embodiments of the present disclosure may be applied to the cellular Internet of Things system, such as the cellular passive Internet of Things system, or may be applied to other scenarios in which a terminal device transmits information to a network device through the zero power-consumption communication mode or battery-free communication mode. The present disclosure is not limited to this.

It should be noted that, the zero power-consumption communication mode may include a back-scattering communication mode, or may include other modes, used for the zero power-consumption terminal to perform communication, introduced during the standard evolution. The following is an example of the first terminal performing communication through the back-scattering mode, but the present disclosure is not limited to this.

In some embodiments, the first signal may be used as a power signal of the first terminal. For example, the first terminal may receive the first signal, perform power harvesting to obtain power, and activate a chip circuit inside the first terminal based on the obtained power to carry out the back-scattering communication.

In some embodiments, the first signal may be used as a carrier signal of the first terminal. That is, the first signal may be used as a signal source of the reflected back-scattering signal. For example, the first terminal may modulate the first signal to obtain the back-scattering signal.

It should be understood that, in some embodiments of the present disclosure, the power signal and the carrier signal of the first terminal may be the same signal or may be different signals. That is, the first terminal may determine the target transmitting power of the back-scattering signal based on the receiving power of the power signal or may determine the target transmitting power of the back-scattering signal based on the receiving power of the carrier signal.

It should also be understood that, in some embodiments of the present disclosure, the power signal and the carrier signal of the first terminal may be provided by the same device or may be provided by different devices.

In some embodiments of the present disclosure, the power signal of the first terminal is transmitted by a first device. The first device may be a network device, or the first device may be a third-party device other than the network device and the first terminal, such as a specialized power node in a cell, or a second terminal. In this case, the second terminal may be an active terminal, or the second terminal is a non-zero power-consumption terminal. That is, the first terminal may be powered by the network device or may be powered by the third-party device. When the first terminal is powered by the third-party device, the communication distance of the zero power-consumption terminal may not be affected by the coverage of the power signal from the network device to the zero power-consumption terminal, and the communication distance of the zero power-consumption device may be extended.

It should be understood that, the power control mode of some embodiments of the present disclosure may be applied to the power control of a sidelink or may be applied to the power control of a non sidelink.

In some embodiments, the method 200 further includes the following operations.

At S220, the first terminal transmits the back-scattering signal to a network device at the target transmitting power.

That is, a target receiving end of the back-scattering signal transmitted by the first terminal may be the network device. That is, the back-scattering communication is uplink communication, or non-sidelink communication, which is referred to as a scenario 1.

In this case, the power control may give consideration to interference on other users and interference on adjacent cells when the back-scattering signal transmitted by the first terminal reaches the network device.

In another some embodiments, the method further includes the following operations.

At S230, the first terminal transmits the back-scattering signal to a second terminal at the target transmitting power.

That is, a target receiving end of the back-scattering signal transmitted by the first terminal may be the second terminal. The second terminal may be a zero power-consumption terminal or may be an active terminal. That is, the back-scattering communication is sidelink communication, which is referred to as a scenario 2.

In this case, the power control may give consideration to the interference of the back-scattering signal transmitted by the first terminal on the uplink reception of the network device and the interference among sidelink communications.

In some embodiments of the present disclosure, the transmitting end of the back-scattering signal may perform power control on the back-scattering signal. For example, power control may be performed based on the first information. Alternatively, the transmitting end of the carrier signal corresponding to the back-scattering signal may perform power control on the carrier signal, so as to achieve the purpose of performing power control on the back-scattering signal. Herein, the carrier signal is configured to generate the back-scattering signal.

In some embodiments, the power control in the scenario 1 may be achieved in the following modes.

In a power control mode 1, the first terminal may perform power control on the back-scattering signal based on the first information. In this case, the first information may include a power control parameter for the non-sidelink communication.

The back-scattering signal is obtained by modulating the first signal, and therefore, there is an association relationship between the power of the first signal and the power of the back-scattering signal.

In a power control mode 2, the network device may control the transmitting power of the first signal to control the transmitting power of the back-scattering signal of the first signal.

In a power control mode 3, the internetwork terminal directly controls the transmitting power of the back-scattering signal transmitted by the first terminal.

In some embodiments, the power control in the scenario 2 may be achieved in the following modes.

In a power control mode 1, the first terminal may perform power control on the back-scattering signal based on the first information. In this case, the first information may include a power control parameter for the sidelink communication.

In a power control mode 2, the second terminal may control the transmitting power of the first signal to control the transmitting power of the back-scattering signal of the first signal. For example, the second terminal may autonomously perform power control on the first signal. In some embodiments, the second terminal may also perform power control on the first signal based on the configuration of the network device.

In a power control mode 3, the second terminal directly control the transmitting power of the back-scattering signal transmitted by the first terminal.

That is, in some embodiments of the present disclosure, the power control of the back-scattering signal may be performed by the transmitting end of the back-scattering signal or may be performed by the transmitting end of the carrier signal corresponding to the back-scattering signal, such as the network device or the second terminal.

It should be understood that, the specific implementation of the power control mode 1 in the scenario 1 is similar to that of the power control mode 1 in the scenario 2, and the difference lies in different functions of the power control parameters used by the power control mode 1 in the scenario 1 and the power control mode 1 in the scenario 2. The specific implementation of the power control mode 2 in the scenario 1 is similar to that of the power control mode 2 in the scenario 2, and the difference lies in that the second terminal may refer to the power control parameter provided by the network device to perform power control. The specific implementation of the power control mode 3 in the scenario 1 is similar to that of the power control mode 3 in the scenario 2, and the difference lies in that the second terminal may refer to the power control parameter provided by the network device to perform power control.

The specific implementations of the aforesaid power control modes 1-3 will be described in detail below.

Power Control Mode 1

In some embodiments of the present disclosure, S210 may include:

- determining, by the first terminal, a path loss based on the receiving power of the first signal; and
- determining a target transmitting power for transmitting the back-scattering signal based on the path loss.

In some embodiments, the first signal is transmitted at a first power, and the first terminal may determine the path loss between the first terminal and the transmitting end of the first signal based on the first power and the receiving power of the first signal.

In some embodiments, the first power is predefined or the first power is configured by the network device. For example, the first signal includes indication information, and the indication information is configured to indicate the transmitting power of the first signal. That is, when transmitting the first signal, the transmitting end of the first signal may modulate the first signal to enable the first signal to carry the indication information, so as to notify the receiving end of the first signal that the first signal is transmitted at the first power. In this way, the receiving end of the first signal may determine the path loss between the transmitting end of the first signal and the receiving end of the first signal based on the receiving power of the first signal and the first power.

In some embodiments of the present disclosure, the determining the target transmitting power for transmitting the back-scattering signal based on the path loss includes:

- determining the target transmitting power for transmitting the back-scattering signal based on the path loss and a target receiving power.

In some embodiments, the target receiving power may refer to the receiving power reaching the receiving end of the back-scattering signal, which is expected by the receiving end of the back-scattering signal.

In some embodiments, the target receiving power may be predefined or the target receiving power may be configured by the network device.

For example, the target receiving power is configured by the network device through a power control command.

For another example, the target received power is indicated by the first signal.

It should be understood that, the setting of the target receiving power needs to take into account that the receiving end of the back-scattering signal may correctly demodulate the received back-scattering signal and the interference on other transmissions is minimized.

In some embodiments of the present disclosure, for different communication modes, interference considered by the power control is different. For example, for the sidelink communication, functions of the power control include suppressing the interference on uplink reception of the base station and the interference among sidelink communications. For the non-sidelink communication, functions of the power control include suppressing the interference on other users and adjacent cells as the back-scattering signal reaches the network device. Therefore, for different communication modes or scenarios, corresponding target receiving powers are configured. For example, for the sidelink communication and the non-sidelink communication, the corresponding target receiving powers may be configured, or for different receiving ends (such as the network device or the second terminal), corresponding target receiving powers may be configured.

In some embodiments, the number of the target receiving powers configured on the first terminal is multiple.

For example, the multiple target receiving powers include multiple target receiving powers for uplink power control. The multiple target receiving powers may be set based on different distances between the terminal devices and the network device. In this way, the terminal devices at different positions in the cell may determine the target transmitting powers of the back-scattering signals based on the appropriate target receiving powers.

For another example, the multiple target receiving powers include multiple target receiving powers for sidelink power control. The multiple target receiving powers may be set based on different distances among the terminal devices. In this way, the target transmitting powers of the back-scattering signals may be determined among the terminal devices with different distances based on the appropriate target receiving powers.

In some embodiments, the first terminal may determine the target transmitting power of the back-scattering signal based on the following formula:

$$P=P_{Target}+PL.$$

Herein, P represents the target transmitting power of the back-scattering signal, $P_{Target}$ represents the target receiving power, and PL represents the path loss.

In practical applications, the zero power-consumption terminal usually has no power amplifier, and therefore the adjustment of the transmitting power of the back-scattering signal, which is performed by the zero power-consumption terminal, may only be limited to reducing the transmitting power to satisfy the target receiving power. For example, the transmitting power of the back-scattering signal is adjusted by the load resistor.

In some embodiments, the receiving power of the carrier signal configured to generate the back-scattering signal is needed to be greater than or equal to the target transmitting power of the back-scattering signal calculated based on the target receiving power, and in this way, the first terminal may adjust the power of the carrier signal to enable the power of the back-scattering signal satisfy the target receiving power when reaching the receiving end.

In some embodiments, when the first terminal is configured with multiple target receiving powers, the first terminal may determine the target receiving power configured to calculate the target transmitting power of the back-scattering signal from the multiple target receiving powers.

For example, at least one of transmitting powers of the back-scattering signal, which is determined by the first terminal based on the multiple target receiving powers, is less than or equal to the receiving power of the first signal. In this case, the first terminal may select a corresponding one of the at least one transmitting powers as the target transmitting power or may determine a maximum one of the at least one transmitting powers as the target transmitting power.

For another example, if each of transmitting powers of the back-scattering signal determined based on the multiple target receiving powers is less than the receiving power of the first signal, the maximum one of the multiple target receiving powers may be determined as the target receiving power configured to calculate the target transmitting power.

For example, the network device configures three target receiving powers for the first terminal, which are $P_{Target1}$, $P_{Target2}$, and $P_{Target3}$ respectively. The power of the carrier signal measured by the first terminal is needed to be greater than or equal to the transmitting power of the back-scattering signal calculated based on at least one of the three target receiving powers. If each of the powers of the back-scattering signal calculated based on the three target receiving powers is less than the power of the carrier signal measured by the first terminal, in some implementations, the first terminal may select the maximum one of the multiple target receiving powers to calculate the target transmitting power of the back-scattering signal.

In some embodiments of the present disclosure, the method 200 also includes:

- determining a target resource for transmitting the back-scattering signal from multiple resources based on the target receiving power.

In some embodiments, the multiple resources may correspond to different target receiving powers respectively, and in this way, the terminal device with different target receiving powers may select different resources to transmit back-scattering signals, inter-user interference may be avoided, and it may be ensured that the powers of the back-scattering signals, reaching the network device and being transmitted by different terminals are as close as possible.

In some embodiments, the resource may include a time-domain resource and/or a frequency-domain resource.

In some embodiments, the multiple resources are predefined or the multiple resources are configured by the network device. For example, the multiple resources are configured through the first signal.

For example, when the first signal is back scattered, different frequency offsets are added, such that frequency-domain positions of the back-scattering signal and the first signal are different from each other, and different back-scattering signals correspond to different frequency-domain positions.

Figure 7:
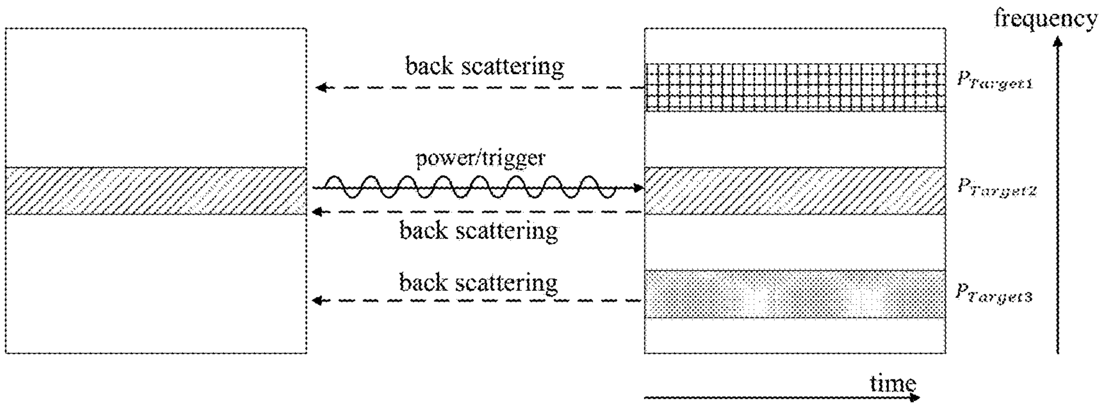
FIG. 7 is a schematic view illustrating a terminal device with different target receiving powers transmits back scattering signals through different frequency-domain resources.

FIG. 7 is a schematic view of selecting the satisfied target receiving power based on the receiving power of the first signal and determining the corresponding frequency-domain resource for transmitting the back-scattering signal based on the target receiving power.

For example, the terminal devices, which satisfies different target receiving powers, select resources on different time units to transmit the back-scattering signals.

Figure 8:
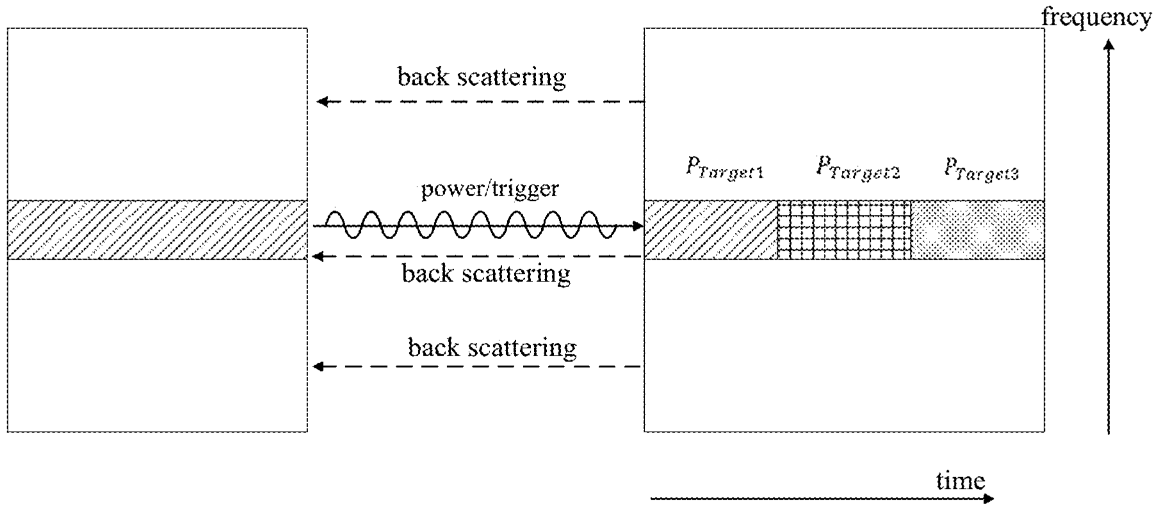
FIG. 8 is a schematic view illustrating a terminal device with different target receiving powers transmits back-scattering signals through different time-domain resources.

FIG. 8 is a schematic view of selecting the satisfied target receiving power based on the receiving power of the first signal and determining the corresponding time-domain resource for transmitting the back-scattering signal based on the target receiving power.

In some embodiments of the present disclosure, when the target transmitting power of the back-scattering signal is determined, a power offset parameter may also be considered.

In some embodiments, the determining, by the first terminal, the target transmitting power for transmitting the back-scattering signal based on the path loss and a target receiving power includes:

- determining the target transmitting power for transmitting the back-scattering signal based on the path loss, the target receiving power, and the first power offset parameter.

In some embodiments, the first terminal may determine the target transmitting power based on the following formula:

$$P=P_{Target}+PL+\Delta P_1.$$

Herein, P represents the target transmitting power of the back-scattering signal, $P_{Target}$ represents the target receiving power, PL represents the path loss, and $\Delta P_1$ represents the first power offset parameter.

In some embodiments, the first power offset parameter may include a power offset parameter related to at least one of: a transmitting end of a power signal, a transmitting end of a carrier signal, a receiving end of the back-scattering signal, and a communication mode.

In some embodiments, different sources of power signals may correspond to different power offset parameters. For example, when the first terminal is powered by the network device and the third-party device, the corresponding power offset parameters are different from each other.

In some embodiments, different sources of carrier signals may correspond to different power offset parameters. For example, when the first terminal is provided with carrier signals by the network device and the second terminal, the corresponding power offset parameters are different from each other.

In some embodiments, different communication modes may correspond to different power offset parameters. For example, when the receiving end of the back-scattering signal is the network device and the second terminal, that is, in scenarios of the non-sidelink communication and sidelink the communication, the corresponding power offset parameters are different from each other.

It should be understood that, the factors considered in the aforesaid power offset parameters are only illustrated as examples. In some embodiments, the power offset parameters related to other factors in the back-scattering communication may be included, and the present disclosure is not limited to this.

In some embodiments, the first power offset parameter includes at least one of:

- a compensation factor for the path loss;
- a power offset parameter related to a carrier signal;
- a power offset parameter related to the back-scattering signal; and
- a power offset parameter related to a communication mode.

As an example, rather than a limitation, the power offset parameter related to the carrier signal includes the power offset parameter related to resource information of the carrier signal, such as the power offset parameter related to the time-domain resource of the carrier signal, and/or the power offset parameter related to the frequency-domain resource of the carrier signal.

As an example, rather than a limitation, the power offset parameter related to the back-scattering signal include a power offset parameter related to resource information of the back-scattering signal and/or a power offset parameter related to a transmitting parameter of the back-scattering signal.

In some embodiments, the power offset parameter related to the resource information of the back-scattering signal includes:

- a power offset parameter related to the time-domain resource of the back-scattering signal; and/or
- a power offset parameter related to the frequency-domain resource of the back-scattering signal.

In some embodiments, the power offset parameter related to the transmitting parameter of the back-scattering signal includes:

- a power offset parameter related to a rate of information carried in the back-scattering signal; and/or
- a power offset parameter related to a modulation mode of the back-scattering signal.

It should be understood that, some embodiments of the present disclosure do not limit the configuration mode of the first power offset parameter. For example, the first power offset parameter may be predefined, or the first power offset parameter may be configured by the network device, or some parameters of the first power offset parameter are predefined, and other parameters are configured by the network device. For example, some or all of first power offset parameters are configured by the network device through a power control command. For example, some or all of first power offset parameters are configured by the network device through the first signal.

In some embodiments, for the aforementioned scenario 2, the target receiving end of the back-scattering signal is the second terminal, that is, the communication mode is the sidelink communication, and the first power offset parameter may include the power offset parameter used for the sidelink communication. For the aforementioned scenario 1, the target receiving end of the back-scattering signal is the network device, that is, the communication mode is the non-sidelink communication, and the first power offset parameter may include the power offset parameter used for the non-sidelink communication.

In another some embodiments, when the power signal is transmitted by the network device, the first power offset parameter includes the power offset parameter corresponding to which the network device supplies power. When the power signal is transmitted by the third-party device, the first power offset parameter includes the power offset parameter corresponding to which the third-party device supplies power.

In some embodiments, the first terminal may adopt the corresponding power control mode based on the source of the power signal (i.e., the transmitting end of the power signal). For the network device, different power control parameters may be configured for different power modes. In some embodiments, the network device may obtain its own deployment and the deployment of the third-party device, based on which the appropriate power control parameter may be configured. For example, the network device may respectively configure corresponding power offset parameters for the power supply of the network device and the power supply of the third-party device respectively. Furthermore, the first terminal may determine the power offset parameter configured to calculate the target transmitting power based on the source of the power signal, and then determine the target transmitting power based on the power offset parameter.

In some embodiments of the present disclosure, the path loss determined based on the receiving power of the first signal is the path loss between the transmitting end of the first signal and the receiving end of the first signal (i.e. the first terminal). If the transmitting end of the first signal and the receiving end of the back-scattering signal are different devices, the determined path loss is not the path loss between the receiving end of the back-scattering signal and the first terminal. In this case, there may be some error in determining the target transmitting power based on the path loss. Therefore, in some embodiments of the present disclosure, the first terminal may compensate the path loss based on a compensation factor for the path loss. For example, the path loss may be multiplied by the compensation factor. Alternatively, the path loss may be compensated based on a compensation value for the path loss, such as, adding the compensation value to the path loss. It should be understood that the compensation value may be a positive value, or may be a negative value, or may be zero.

In some embodiments, the target transmitting power of the back-scattering signal may be determined based on the following formula:

$$P=P_{Target}+\alpha\cdot PL \text{ or } P=P_{Target}+PL+\Delta pl.$$

Herein, P represents the target transmitting power of the back-scattering signal, $P_{Target}$ represents the target receiving power, PL represents the path loss, $\alpha$ represents the compensation factor for the path loss, and $\Delta$pl represents the compensation value for the path loss.

In some embodiments, the compensation factor or compensation value for the path loss may be determined based on a relationship between a distance between the transmitting end of the first signal and the first terminal and a distance between the receiving end of the back-scattering signal and the first terminal.

For example, if the first signal is transmitted by the network device and the receiving end of the back-scattering signal is the network device, in this case, the path loss determined based on the receiving power of the first signal may not be compensated. For example, the compensation factor may be 1, or the compensation value may be zero.

For example, if the first signal is transmitted by the network device and the receiving end of the back-scattering signal is the second terminal, in this case, the path loss determined based on the receiving power of the first signal needs to be compensated.

In some embodiments, when the distance between the second terminal and the first terminal is greater than the distance between the network device and the first terminal, the compensation factor is greater than 1, or the compensation value is a positive value.

In some embodiments, when the distance between the second terminal and the first terminal is less than the distance between the network device and the first terminal, the compensation factor is less than 1, or the compensation value is a negative value.

In some embodiments, the compensation factor for path loss may be determined by the network device based on the deployment of the terminal device in the cell, and further configured for the terminal device in the cell, for example, transmitted to the terminal device through the power control command, or the power signal, or the carrier signal.

In some embodiments of the present disclosure, the method 200 also includes:

- determining, by the first terminal, the power offset parameter configured to calculate the transmitting power of the back-scattering signal based on at least one of: the transmitting end of the first signal, the target receiving end of the back-scattering signal, and the communication mode.

In some embodiments, the first terminal determines the transmitting end of the first signal based on the first signal.

In some implementations, the first terminal determines the transmitting end of the first signal based on at least one of:

- a frequency position of the first signal;
- a time unit of the first signal;
- a waveform of the first signal; and
- indication information carried in the first signal, the indication information being configured to indicate the transmitting end of the first signal.

In practical applications, the chip circuit of the terminal device performs back-scattering processing on the received carrier signal, and the obtained back-scattering signal also has a certain power loss. Therefore, when determining the target transmitting power of the back-scattering signal, the power loss caused by the back-scattering processing may also be compensated.

In some embodiments, the target transmitting power of the back-scattering signal may be determined based on the following formula:

$$P=P_{Target}+PL+P_{bs}.$$

Herein, P represents the target transmitting power of the back-scattering signal, $P_{Target}$ represents the target receiving power, PL represents the path loss, $P_{bs}$ represents a back-scattering loss, that is, the power loss caused by processing the carrier signal to obtain the back-scattering signal.

In some embodiments, the target transmitting power of the back-scattering signal may be determined based on the following formula:

$$P=P_{Target}+\alpha\cdot PL+P_{bs} \text{ or } P=P_{Target}+PL+\Delta pl+P_{bs}.$$

Herein, P represents the target transmitting power of the back-scattering signal, $P_{Target}$ represents the target receiving power, PL represents the path loss, $P_{bs}$ represents the back-scattering loss, $\Delta$pl represents the compensation factor for the path loss, and $\alpha$ represents the compensation value for the path loss.

In conclusion, when the target receiving end of the back-scattering signal is the network device, the first terminal may determine the target transmitting power by using the method of the aforementioned embodiments. In this case, the power control parameter used by the first terminal to calculate the target transmitting power is the power control parameter used for the non-sidelink communication, such as the target receiving power used for the non-sidelink communication, the power offset parameter used for the non-sidelink communication, and so on. When the target receiving end of the back-scattering signal is the second terminal, the first terminal may also determine the target transmitting power by using the method of the aforementioned embodiments. In this case, the power control parameter used by the first terminal to calculate the target transmitting power are the power control parameter used for the sidelink communication, such as the target receiving power used for the sidelink communication, the power offset parameter used for the sidelink communication, and so on.

Power Control Mode 2

In the power control mode 2, the transmitting end of the first signal may control the transmitting power of the back-scattering signal corresponding to the first signal by controlling the transmitting power of the first signal.

In some embodiments, the transmitting end of the first signal is the network device. In this case, the network device may determine the target transmitting power of the first signal based on the path loss between the network device and the first terminal.

For example, the network device may transmit a third signal to the first terminal, receive the back-scattering signal of the third signal, and determine the path loss between the network device and the first terminal based on the transmitting power of the third signal and the receiving power of the back-scattering signal of the third signal. For example, a half of the difference value between the transmitting power of the third signal and the receiving power of the back-scattering signal of the third signal is determined as the path loss between the first terminal and the network device.

In some embodiments, the network device may determine the transmitting power of the first signal based on the path loss and the target receiving power. For example, the sum of the path loss and the target receiving power may be determined as the transmitting power of the first signal.

In some embodiments, the network device may determine the transmitting power of the first signal based on the path loss, the target receiving power, and the back-scattering loss. For example, the sum of the path loss, the target receiving power, and the back-scattering loss may be determined as the transmitting power of the first signal.

In some embodiments, the transmitting end of the first signal is the second terminal. In this case, the second terminal may determine the target transmitting power of the first signal based on second information.

In some embodiments, the second information includes at least one of:

- a path loss between the first terminal and the second terminal;
- a second power offset parameter;
- a target receiving power;
- a power control command of the network device, the power control command including a power control parameter configured for a sidelink; and
- a transmitting power of the first signal indicated by the network device.

The method for determining the path loss between the first terminal and the second terminal may be referenced to the method for determining the path loss between the network device and the first terminal, which will not be repeated herein for brevity.

In some embodiments, the target receiving power may be the target receiving power for the sidelink communication, and the second power offset parameter includes the power offset parameter for the sidelink communication.

It should be understood that, the specific implementation of the second power offset parameter may be referenced to the relevant implementation of the first power offset parameter, which will not be repeated herein for brevity.

In some embodiments, the transmitting power of the first signal indicated by the network device may be the target transmitting power of the first signal determined by the network device. The method for the network device to determine the target transmitting power of the first signal may be referenced to the relevant description of the power control mode 1, which will not be repeated herein for brevity.

Power Control Mode 3

In the power control mode 3, the transmitting end of the first signal may directly control the transmitting power of the back-scattering signal.

In some embodiments, the transmitting end of the first signal is the network device. In this case, the network device may determine the target transmitting power of the back-scattering signal based on at least one of the path loss between the first terminal and the network device, the target receiving power, the first power offset parameter, and the back-scattering loss. The specific determination method may be referenced to the relevant description in the aforementioned power control mode 1, which will not be repeated herein for brevity.

In some embodiments, the target transmitting power of the back-scattering signal may be transmitted to the first terminal by the network device through the power control command or transmitted to the first terminal through the first signal.

In some embodiments, the transmitting end of the first signal is the second terminal. In this case, the second terminal may determine the target transmitting power of the back-scattering signal based on the second information, which will not be repeated herein for brevity.

In some embodiments, the target transmitting power may be transmitted to the first terminal by the second terminal through the power control command or transmitted to the first terminal through the first signal.

In some embodiments, when the second terminal is an active terminal, the second terminal may perform power control based on the aforementioned power control mode 2 or power control mode 3.

In some embodiments, the second terminal is a zero power-consumption terminal. In this case, the first terminal may also perform power control on the second terminal based on the received power of the signal transmitted by the second terminal. For example, the first terminal determines a first power control command based on the received power of a third signal transmitted by the second terminal and transmits the first power control command to the second terminal. Herein, the first power control command is configured to control the transmitting power at which the second terminal transmits the back-scattering signal, and the first power control command is configured to control the power of the back-scattering signal transmitted by the second terminal to satisfy the sidelink transmitting requirement and reduce the interference on other users as much as possible.

In some embodiments, the first power control command may include the target transmitting power for the second terminal to transmit the back-scattering signal. In some embodiments, the target transmitting power may be determined by the first terminal based on the method described in the power control mode 1.

The power control modes of some embodiments of the present disclosure are described below in combination with the specific scenarios shown in FIG. 9 and FIG. 10.

Figure 9:
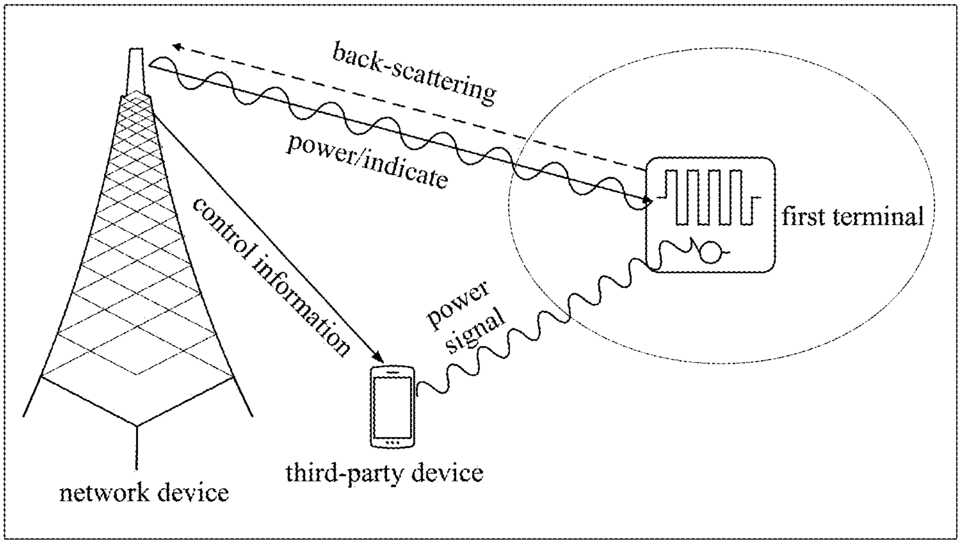
FIG. 9 is a schematic view of a scenario to which embodiments of the present disclosure are applied.

In the scenario shown in FIG. 9, the first terminal may be powered by the network device or may be powered by the third-party device. For example, the third-party device may transmit the power signal based on control information of the network device.

In FIG. 9, the target receiving end of the back-scattering signal is the network device, which corresponds to the aforementioned scenario 1.

Based on the aforementioned power control mode 1, the first terminal may determine the target transmitting power of the back-scattering signal based on the first information.

For example, when the third-party device supplies power, the power offset parameter corresponding to which the third-party device supplies power is selected to calculate the target transmitting power of the back-scattering signal. When the network device supplies power, the power offset parameter corresponding to which the network device supplies power is selected to calculate the target transmitting power of the back-scattering signal.

In some embodiments, whether the transmitting end of the first signal is the network device or the third-party device may be determined based on characteristic information of the first signal or indication information carried in the first signal, and the specific determination method may be referenced to the relevant description of the aforementioned embodiments.

Based on the aforementioned power control mode 2, the network device may indirectly control the transmitting power of the back-scattering signal by controlling the target transmitting power of the first signal.

For example, the network device may determine the target transmitting power of the first signal based on at least one of the path loss between the network device and the first terminal, the target receiving power, the back-scattering loss, and the power offset parameter.

Based on the aforementioned power control mode 3, the network device may directly control the transmitting power of the back-scattering signal.

For example, the network device may determine the target transmitting power of the back-scattering signal based on at least one of the path loss between the network device and the first terminal, the target receiving power, the back-scattering loss, and the power offset parameter. The target transmitting power is further configured for the first terminal, such as configured for the first terminal through the power control command or the first signal.

In the scenario shown in FIG. 10, the first terminal may be powered by the network device or may be powered by the third-party device.

In the scenario shown in FIG. 10, the target receiving end of the back-scattering signal is the second terminal, which corresponds to the aforementioned scenario 2.

Based on the aforementioned power control mode 1, the first terminal may determine the target transmitting power of the back-scattering signal based on the first information.

For example, when the third-party device supplies power, the power offset parameter corresponding to which the third-party device supplies power is selected to calculate the target transmitting power of the back-scattering signal. When the network device supplies power, the power offset parameter corresponding to which the network device supplies power is selected to calculate the target transmitting power of the back-scattering signal.

In some embodiments, the second terminal may be a zero power-consumption terminal, which corresponds to a case 1 in FIG. 10, or the second terminal is an active terminal, which corresponds to a case 2 in FIG. 10.

For the case 1, the first terminal may also perform power control on signal transmission of the second terminal based on the receiving power of the signal transmitted by the second terminal. For example, the first terminal determines a first power control command based on the receiving power of the signal transmitted by the second terminal, and further transmits the first power control command to the second terminal. Herein, the first power control command is configured to control the transmitting power at which the second terminal transmits the back-scattering signal, and the first power control command is configured to control the power of the back-scattering signal transmitted by the second terminal to satisfy the sidelink transmitting requirement and reduce the interference on other users as much as possible.

For the case 2, based on the aforementioned power control mode 2, the second terminal may indirectly control the transmitting power of the back-scattering signal by controlling the target transmitting power of the first signal.

For example, the second terminal may determine the target transmitting power of the first signal based on at least one of the path loss between the second terminal and the first terminal, the target receiving power, the back-scattering loss, the power offset parameter, the power control command of the network device, and the transmitting power of the first signal indicated by the network device. The specific determination method may be referenced to the relevant implementation in the aforementioned power control mode 1.

In some embodiments, the power control command may include the power control parameters used for the sidelink.

Based on the aforementioned power control mode 3, the second terminal may directly control the transmitting power of the back-scattering signal transmitted by the first terminal.

For example, the second terminal may determine the target transmitting power of the back-scattering signal based on at least one of the path loss between the second terminal and the first terminal, the target receiving power, the back-scattering loss, the power offset parameter, the power control command of the network device, and the transmitting power of the back-scattering signal indicated by the network device. The specific determination method may be referenced to the relevant implementation in the aforementioned power control mode 1. Furthermore, the second terminal configures the determined target transmitting power for the first terminal, for example, configures the determined target transmitting power for the first terminal through the power control command or the first signal.

In conclusion, in some embodiments of the present disclosure, the transmitting end of the back-scattering signal may perform power control on the back-scattering signal based on the first information. Alternatively, the transmitting end of the carrier signal corresponding to the back-scattering signal may perform power control on the carrier signal, so as to achieve the purpose of controlling the power of the back-scattering signal. Power control performed on the back-scattering signal is conducive to ensuring link quality and minimizing interference on other devices.

FIG. 11 is a schematic flow chart of a wireless communication method 300 according to some embodiments of the present disclosure. As shown in FIG. 11, the method 300 includes the following operations.

S310, the first device determines a transmitting power of a second signal, the second signal is configured for a first terminal to generate a back-scattering signal, or the second signal is the back-scattering signal of the first terminal.

In some embodiments, the first device is the network device, which corresponds to the scenario 1 in method 200.

That is, the network device may use the aforementioned power control mode 2 to control the power of the carrier signal of the back-scattering signal to achieve the purpose of controlling the power of the back-scattering signal or may directly control the power of the back-scattering signal.

In some embodiments, the first device determines the transmitting power of the second signal by the following operations:

- transmitting, by the network device, a third signal to the first terminal;
- receiving, by the network device, the back-scattering signal, of the third signal, transmitted by the first terminal;
- determining, by the network device, a path loss between the network device and the first terminal based on a transmitting power of the third signal and a receiving power of the back-scattering signal of the third signal; and
- determining the transmitting power of the second signal based on the path loss.

The specific implementation may be referenced to the description of the power control mode 2 of the scenario 1 in method 200, which will not be repeated herein for brevity.

In some embodiments, the first device is the second terminal, which corresponds to the scenario 2 in method 200.

That is, the second terminal may use the aforementioned power control mode 2 to control the power of the carrier signal of the back-scattering signal to achieve the purpose of controlling the power of the back-scattering signal or may directly control the power of the back-scattering signal.

In some embodiments, the first device determines the transmitting power of the second signal by the following operations:

- determining, by the second terminal, the transmitting power of the second signal based on second information, wherein the second information includes at least one of:
  - a path loss between the first terminal and the second terminal;
  - a second power offset parameter; and
  - a power control command of a network device, the power control command including a power control parameter for a sidelink.

The specific implementation may be referenced to the description of the power control mode 2 of the scenario 2 in method 200, which will not be repeated herein for brevity.

In some embodiments, the second power offset parameter includes at least one of:

- a compensation factor for the path loss;
- a power offset parameter related to a carrier signal, the carrier signal being configured to generate the back-scattering signal;
- a power offset parameter related to the back-scattering signal; and
- a power offset parameter related to a communication mode.

In some embodiments, the power offset parameter related to the carrier signal include at least one of:

- a power offset parameter related to a time-domain resource of the carrier signal; and a power offset parameter related to a frequency-domain resource of the carrier signal.

In some embodiments, the power offset parameter related to the back-scattering signal include at least one of:

a power offset parameter related to a time-domain resource of the back-scattering signal;

a power offset parameter related to a frequency-domain resource of the back-scattering signal;

a power offset parameter related to a rate of information carried in the back-scattering signal; and a power offset parameter related to a modulation mode of the back-scattering signal.

In some embodiments, the second power offset parameter is predefined or the second power offset parameter is configured by the network device.

In some embodiments, the method 300 further includes:

transmitting, by the second terminal, a second power control command to the first terminal, wherein the second power control command is configured to control the transmitting power of the back-scattering signal of the first terminal.

In some embodiments, the second power control command may include the target transmitting power at which the first terminal transmits the back-scattering signal.

FIG. 12 is a schematic flow chart of a wireless communication method 400 according to some embodiments of the present disclosure. As shown in FIG. 12, the method 200 includes the following operations.

S410, the network device transmits fourth information to a second terminal. The fourth information is configured to control a power of a first signal transmitted by the second terminal. The receiving end of the first signal is a first terminal. The first signal is configured to power the first terminal and/or configured for the first terminal to generate a back-scattering signal.

That is, in some embodiments, the second terminal may control the power of the first signal based on the fourth information configured by the network device. For example, the transmitting power of the first signal is determined, so as to indirectly control the transmitting power of the back-scattering signal of the first signal. The specific implementation method may be referenced to the related implementation of the power control mode 2 in method 200.

In some embodiments, the fourth information includes the transmitting power of the first signal.

In some embodiments, the transmitting power of the first signal is configured by the network device through a power control command.

In conclusion, in some embodiments of the present disclosure, the transmitting end of the back-scattering signal may control the power of the back-scattering signal based on the first information. Alternatively, the receiving end of the back-scattering signal may control the transmitting power of the first signal to achieve the purpose of controlling the transmitting power of the back-scattering signal of the first signal. Alternatively, the receiving end of the back-scattering signal may directly control the transmitting power of the back-scattering signal transmitted by the transmitting end of the back-scattering signal.

The method embodiments of the present disclosure are described in detail above in combination with FIGS. 6 to 12. The device embodiments of the present disclosure are described in detail below in combination with FIGS. 13 to 19. It should be understood that, the device embodiments and the method embodiments correspond to each other, and similar descriptions may be referenced to the method embodiments.

Figure 13:
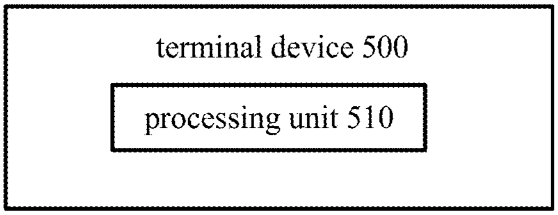
FIG. 13 is a schematic block diagram of a terminal device according to some embodiments of the present disclosure.

FIG. 13 shows a schematic block diagram of a terminal device 500 according to some embodiments of the present disclosure. As shown in FIG. 13, the terminal device 500 includes:

a processing unit 510, configured to determine a target transmitting power at which the terminal device transmits a back-scattering signal based on first information, wherein the first information includes at least one of:

a receiving power of a first signal, the first signal being configured to power the first terminal and/or generate the back-scattering signal;

a target receiving power expected by a receiving end of the back-scattering signal;

a first power offset parameter;

a power control command; and a back-scattering loss.

In some embodiments, the processing unit 510 is further configured to:

determine a path loss based on the receiving power of the first signal; and determining the target transmitting power for transmitting the back-scattering signal based on the path loss.

In some embodiments, the processing unit 510 is further configured to:

determine the target transmitting power for transmitting the back-scattering signal based on the path loss and the target receiving power.

In some embodiments, the processing unit 510 is further configured to:

determine the target transmitting power for transmitting the back-scattering signal based on the path loss, the target receiving power, and the first power offset parameter.

In some embodiments, the first power offset parameter includes a power offset parameter related to at least one of:

a transmitting end of a power signal;

a transmitting end of a carrier signal, the carrier signal being configured to generate the back-scattering signal;

a receiving end of the back-scattering signal; and a communication mode.

In some embodiments, the first power offset parameter includes at least one of:

a compensation factor for a path loss;

a power offset parameter related to a carrier signal, the carrier signal being configured to generate the back-scattering signal;

a power offset parameter related to the back-scattering signal; and a power offset parameter related to a communication mode.

In some embodiments, the power offset parameter related to the carrier signal includes at least one of:

a power offset parameter related to a time-domain resource of the carrier signal; and a power offset parameter related to a frequency-domain resource of the carrier signal.

In some embodiments, the power offset parameter related to the back-scattering signal includes at least one of:

a power offset parameter related to a time-domain resource of the back-scattering signal;

a power offset parameter related to a frequency-domain resource of the back-scattering signal;

a power offset parameter related to a rate of information carried in the back-scattering signal; and a power offset parameter related to a modulation mode of the back-scattering signal.

In some embodiments, the first power offset parameter is predefined, or the first power offset parameter is configured by a network device.

In some embodiments, the first power offset parameter is configured by a network device through the power control command.

In some embodiments, the first power offset parameter is transmitted through the first signal.

In some embodiments, the processing unit 510 is further configured to:

determine a power offset parameter configured to calculate the target transmitting power of the back-scattering signal based on a transmitting end of the first signal and/or a target receiving end of the back-scattering signal.

In some embodiments, the processing unit 510 is further configured to:

determine the transmitting end of the first signal based on the first signal.

In some embodiments, the processing unit 510 is further configured to determine the transmitting end of the first signal based on at least one of:

a frequency position of the first signal;

a time unit of the first signal;

a waveform of the first signal; and indication information carried in the first signal, the indication information being configured to indicate the transmitting end of the first signal.

In some embodiments, the first signal is transmitted by a first device, and the first device is a network device, or the first device is another device except for the network device and the first terminal.

In some embodiments, the processing unit 510 is further configured to:

determine a target resource for transmitting the back-scattering signal from a plurality of resources based on the target receiving power.

In some embodiments, the plurality of resources are predefined, or the plurality of resources are configured by a network device.

In some embodiments, each of the plurality of resources corresponds to one target receiving power.

In some embodiments, the target transmitting power is less than or equal to the receiving power of the first signal.

In some embodiments, the processing unit 510 is further configured to determine a target receiving power configured to calculate the target transmitting power from a plurality of target receiving powers based on the receiving power of the first signal, in response to the terminal device being configured with a plurality of target receiving powers.

In some embodiments, the processing unit 510 is further configured to determine a maximum one of the plurality of target receiving powers as the target receiving power configured to calculate the target transmitting power, in response to transmitting powers of the back-scattering signal determined based on the plurality of target receiving powers are less than the receiving power of the first signal.

In some embodiments, a target receiving end of the back-scattering signal is a network device.

In some embodiments, a target receiving end of the back-scattering signal is a second terminal.

In some embodiments, the terminal device 500 further includes:

a communication unit, configured to transmit a first power control command to the second terminal, the first power control command being configured to control a transmitting power at which the second terminal transmits a back-scattering signal.

In some embodiments, the processing unit 510 is further configured to determine, by the first terminal, the target transmitting power at which the first terminal transmits the back-scattering signal based on a second power control command transmitted by the second terminal.

In some embodiments, the first signal is transmitted by the second terminal.

In some embodiments, the aforesaid communication unit may be a communication interface or a transceiver, or an input/output interface of a communication chip or a system on chip. The processing unit may be one or more processors.

It should be understood that, the terminal device 500 according to some embodiments of the present disclosure may correspond to the first terminal in the method embodiments of the present disclosure, and the aforesaid operations and/or functions and other operations and/or functions of each unit in the terminal device 500 are intend to realize the corresponding process of the first terminal in the method 200 shown in FIGS. 6 to 10, respectively, which are not repeated herein for brevity.

Figure 14:
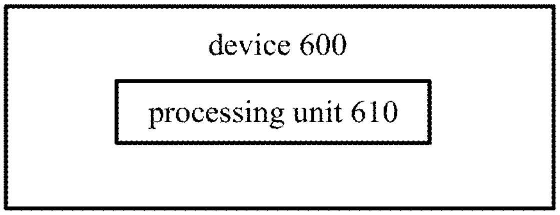
FIG. 14 is a schematic block diagram of a wireless communication device according to some embodiments of the present disclosure.

FIG. 14 is a schematic block diagram of a wireless communication device according to some embodiments of the present disclosure. The device 600 shown in FIG. 14 includes:

a processing unit 610, configured to determine a transmitting power of a second signal, wherein the second signal is configured for a first terminal to generate a back-scattering signal, or the second signal is the back-scattering signal of the first terminal.

In some embodiments, the first device is a network device.

In some embodiments, the device further includes:

a communication unit, configured to transmit a third signal to the first terminal and receive the back-scattering signal, of the third signal, transmitted by the first terminal.

In some embodiments, the processing unit 610 is further configured to:

determine a path loss between the network device and the first terminal based on a transmitting power of the third signal and a receiving power of the back-scattering signal of the third signal and determine the transmitting power of the second signal based on the path loss.

In some embodiments, the first device is a second terminal.

In some embodiments, the processing unit 610 is further configured to determine the transmitting power of the second signal based on second information, wherein the second information includes at least one of:

a path loss between the first terminal and the second terminal;

a second power offset parameter; and a power control command of a network device, the power control command including a power control parameter for a sidelink.

In some embodiments, the second power offset parameter includes at least one of:

a compensation factor for the path loss;

a power offset parameter related to a carrier signal, the carrier signal being configured to generate the back-scattering signal;

a power offset parameter related to the back-scattering signal; and a power offset parameter related to a communication mode.

In some embodiments, the power offset parameter related to the carrier signal includes at least one of:

a power offset parameter related to a time-domain resource of the carrier signal; and a power offset parameter related to a frequency-domain resource of the carrier signal.

In some embodiments, the power offset parameter related to the back-scattering signal includes at least one of:

a power offset parameter related to a time-domain resource of the back-scattering signal;

a power offset parameter related to a frequency-domain resource of the back-scattering signal;

a power offset parameter related to a rate of information carried in the back-scattering signal; and a power offset parameter related to a modulation mode of the back-scattering signal.

In some embodiments, the second power offset parameter is predefined, or the second power offset parameter is configured by the network device.

In some embodiments, the device further includes:

a communication unit, configured to transmit a second power control command to the first terminal, the second power control command being configured to control the transmitting power of the back-scattering signal of the first terminal.

In some embodiments, the aforesaid communication unit may be a communication interface or a transceiver, or an input/output interface of a communication chip or a system on chip. The processing unit may be one or more processors.

It should be understood that, the terminal device 600 according to some embodiments of the present disclosure may correspond to the first device in the method embodiments of the present disclosure, and the aforesaid operations and/or functions and other operations and/or functions of each unit in the device 600 are intend to realize the corresponding process of the first device in the method 300 shown in FIG. 11, which are not repeated herein for brevity.

Figure 15:
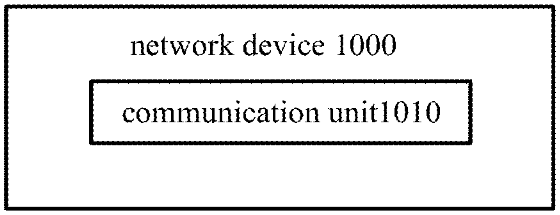
FIG. 15 is a schematic block diagram of a network device according to some embodiments of the present disclosure.

FIG. 15 is a schematic block diagram of a network device for wireless communication according to some embodiments of the present disclosure. The network device 1000 shown in FIG. 15 includes:

a communication unit 1010, configured to transmit third information to a terminal device, wherein the third information is configured to control a power of a back-scattering signal transmitted by the terminal device.

In some embodiments, the third information is configured to indicate at least one of:

a target receiving power expected by a receiving end of the back-scattering signal;

a first power offset parameter; and one or more resources for transmitting the back-scattering signal.

In some embodiments, the first power offset parameter includes a power offset parameter related to at least one of:

a transmitting end of a power signal;

a transmitting end of a carrier signal, the carrier signal being configured to generate the back-scattering signal;

a receiving end of the back-scattering signal; and a communication mode.

In some embodiments, the first power offset parameter includes at least one of:

a compensation factor for a path loss;

a power offset parameter related to a carrier signal, the carrier signal being configured to generate the back-scattering signal;

a power offset parameter related to the back-scattering signal; and a power offset parameter related to a communication mode.

In some embodiments, the power offset parameter related to the carrier signal includes at least one of:

a power offset parameter related to a time-domain resource of the carrier signal; and a power offset parameter related to a frequency-domain resource of the carrier signal.

In some embodiments, the power offset parameter related to the back-scattering signal includes at least one of:

a power offset parameter related to a time-domain resource of the back-scattering signal;

a power offset parameter related to a frequency-domain resource of the back-scattering signal;

a power offset parameter related to a rate of information carried in the back-scattering signal; and a power offset parameter related to a modulation mode of the back-scattering signal.

In some embodiments, the one or more resources for transmitting the back-scattering signal includes a plurality of resources respectively corresponding to a plurality of target receiving powers.

In some embodiments, the first power offset parameter is configured by the network device through a power control command.

In some embodiments, the first power offset parameter is transmitted by the network device through a first signal, and the first signal is configured to power the terminal device and/or generate the back-scattering signal.

In some embodiments, the aforesaid communication unit may be a communication interface or a transceiver, or an input/output interface of a communication chip or a system on chip. The processing unit may be one or more processors.

It should be understood that the network device 1000 according to some embodiments of the present disclosure may correspond to the network device in the method embodiments of the present disclosure, and the aforesaid operations and/or functions and other operations and/or functions of each unit in the network device 1000 are intend to realize the corresponding process of the network device in the methods shown in FIGS. 6 to 11, respectively, which are not repeated herein for brevity.

Figure 16:
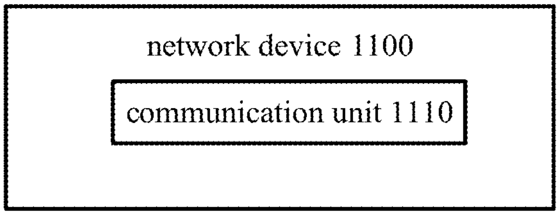
FIG. 16 is a schematic block diagram of another network device according to some embodiments of the present disclosure.

FIG. 16 is a schematic block diagram of a network device for wireless communication according to some embodiments of the present disclosure. The network device 1100 shown in FIG. 16 includes:

a communication unit 1110, configured to transmit fourth information to a second terminal, wherein the fourth information is configured to control a power of a first signal transmitted by the second terminal, a receiving end of the first signal is a first terminal, and the first signal is configured to power the first terminal and/or configured for the first terminal to generate a back-scattering signal.

In some embodiments, the fourth information includes a transmitting power of the first signal.

In some embodiments, the transmitting power of the first signal is configured by the network device through a power control command.

In some embodiments, the aforesaid communication unit may be a communication interface or a transceiver, or an input/output interface of a communication chip or a system on chip. The processing unit may be one or more processors.

It should be understood that the network device 1100 according to some embodiments of the present disclosure may correspond to the network device in the method embodiments of the present disclosure, and the aforesaid operations and/or functions and other operations and/or functions of each unit in the network device 1100 are intend to realize the corresponding process of the network device in method 400 shown in FIG. 12, which are not repeated herein for brevity.

Figure 17:
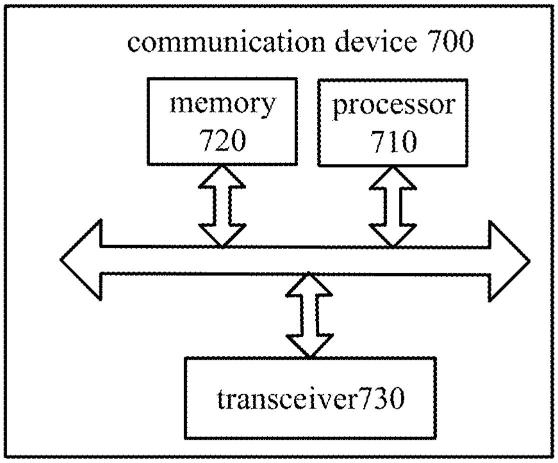
FIG. 17 is a schematic block diagram of a communication device according to some embodiments of the present disclosure.

FIG. 17 is a schematic structural diagram of a communication device 700 according to some embodiments of the present disclosure. The communication device 700 shown in FIG. 17 includes a processor 710, and the processor 710 may call and run a computer program from a memory to perform the method in embodiments of the present disclosure.

In some embodiments, as shown in FIG. 17, the communication device 700 may further include a memory 720. The processor 710 may call and run a computer program from the memory 720 to perform the method in embodiments of the present disclosure.

The memory 720 may be a separate device independent of the processor 710 or may be integrated in the processor 710.

In some embodiments, as shown in FIG. 17, the communication device 700 may further include a transceiver 730, and the processor 710 may control the transceiver 730 to communicate with other devices. Specifically, the transceiver may transmit information or data to other devices, or receive information or data transmitted by other devices.

The transceiver 730 may include a transmitter and a receiver. The transceiver 730 may further include one or more antennas.

In some embodiments, the communication device 700 may specifically be the network device in embodiments of the present disclosure, and the communication device 700 may implement the corresponding processes implemented by the network device in various methods according to embodiments of the present disclosure, which are not repeated herein for brevity. In some embodiments, the communication device 700 may specifically be the mobile terminal/mobile device in embodiments of the present disclosure, such as the first device and the second device, and the communication device 700 may implement the corresponding processes implemented by the first device or the second device in various methods according to embodiments of the present disclosure, which are not repeated herein for brevity.

Figure 18:
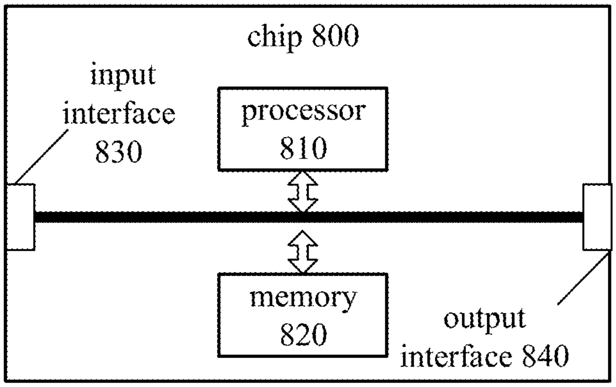
FIG. 18 is a schematic block diagram of a chip according to some embodiments of the present disclosure.

FIG. 18 is a schematic structural diagram of a chip according to some embodiments of the present disclosure. The chip 800 shown in FIG. 18 includes a processor 810, and the processor 810 may call and run a computer program from a memory to implement the method according to embodiments of the present disclosure.

In some embodiments, as shown in FIG. 18, the chip 800 may further include a memory 820. The processor 810 may call and run a computer program from the memory 820 to implement the method according to embodiments of the present disclosure.

The memory 820 may be a separate device independent of the processor 810 or may be integrated in the processor 810.

In some embodiments, the chip 800 may further include an input interface 830. The processor 810 may control the input interface 830 to communicate with other devices or chips, and specifically, the processor 810 may control the input interface to obtain information or data transmitted by other devices or chips.

In some embodiments, the chip 800 may further include an output interface 840. The processor 810 may control the output interface 840 to communicate with other devices or chips, and specifically, the processor 810 may control the output interface 840 to output information or data to other devices or chips.

In some embodiments, the chip may be applied to the network device in embodiments of the present disclosure, and the chip may implement the corresponding processes implemented by the network device in various methods according to embodiments of the present disclosure, which are not repeated herein for brevity.

In some embodiments, the chip may be applied to the mobile terminal/mobile device in embodiments of the present disclosure, and the chip may implement the corresponding processes implemented by the mobile terminal/mobile device in various methods according to embodiments of the present disclosure. For brevity, details are not repeated herein again.

It should be understood that, the chip in the embodiments of the present disclosure may be referred to as a system-level chip, a system chip, a chip system, or a system-on-chip, etc.

Figure 19:
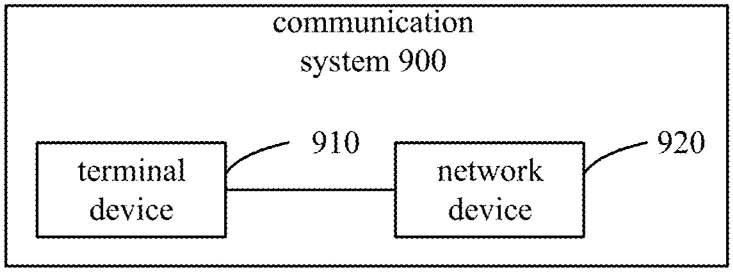
FIG. 19 is a schematic block diagram of a communication system according to some embodiments of the present disclosure.

FIG. 19 is a schematic block diagram of a communication system 900 according to some embodiments of the present disclosure. As shown in FIG. 19, the communication system 900 includes a terminal device 910 and a network device 920.

The terminal device 910 may be configured to realize the corresponding functions realized by the terminal device (such as the first terminal and the second terminal) in the above method, and the network device 920 may be configured to realize the corresponding functions realized by the network device in the above method, which are not repeated herein for brevity.

It should be understood that the processor in some embodiments of the present disclosure may be an integrated circuit chip with a signal processing capability. In a process of implement above method, each operation of the above method embodiments may be completed by an integrated logic circuit of a hardware in the processor or instructions in a form of software. The above processors may be general purpose processors, Digital Signal Processors (DSPs), Application Specific Integrated Circuits (ASICs), Field Programmable Gate Arrays (FPGAs) or other programmable logic components, discrete gates or transistor logic components, or discrete hardware components. Each method, operation and logic block diagram disclosed in some embodiments of the present disclosure may be implemented or performed. The general processor may be a microprocessor or the processor may also be any conventional processor, etc. The operations in combination with the methods in some embodiments of the present application may be directly performed by a hardware decoding processor or the combination of a hardware and a software module in the decoding processor. The software module may be located in a random access memory, a flash memory, a read-only memory, a programmable read-only memory, or an electrically erasable programmable memory, a register, or other mature storage medium in the field. The storage medium is located in a memory, and the processor reads information in the memory and completes the operations of the above methods in combination with the hardware.

It should be understood that the memory in some embodiments of the present disclosure may be a transitory memory and/or a non-transitory memory. The non-transitory memory may be a Read-Only Memory (ROM), a Programmable ROM (PROM), an Erasable PROM (EPROM), an Electrically erasable EPROM (EEPROM) or a flash memory. The transitory memory may be a Random Access Memory (RAM), which is configured as an external cache. By a way of illustration but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchrolink DRAM (SLDRAM), and a Direct Rambus RAM (DR RAM). It should be noted that the memory of the systems and methods described herein is intended to include, but not limited to, these and any other suitable types of memory.

It should be understood that the above memory is an example but not a limiting description. For example, the memory in the embodiments of the present disclosure may also be a SRAM, a DRAM, a SDRAM, a DDR SDRAM, an ESDRAM, a SLDRAM, or a DR RAM. That is, the memory in the embodiments of the present disclosure is intended to include, but not limited to, these and any other suitable types of memory.

Some embodiments of the present disclosure also provide a computer-readable storage medium for storing computer programs.

In some embodiments, the computer-readable storage medium may be applied to the network device in embodiments of the present disclosure, and the computer programs cause a computer to perform the corresponding processes implemented by the network device in various methods according to embodiments of the present disclosure, which are not repeated herein for brevity.

In some embodiments, the computer-readable storage medium may be applied to the mobile terminal/terminal device in embodiments of the present disclosure, such as the first device and the second device, and the computer programs cause a computer to perform the corresponding processes implemented by the mobile terminal/terminal device (such as the first device and the second device) in various methods according to embodiments of the present disclosure, which are not repeated herein for brevity.

Some embodiments of the present disclosure provide a computer program product, including a computer program instruction.

In some embodiments, the computer program product may be applied to the network device in embodiments of the present disclosure, and the computer program instructions cause a computer to perform the corresponding processes implemented by the network device in various methods according to embodiments of the present disclosure, which are not repeated herein for brevity.

In some embodiments, the computer program product may be applied to the mobile terminal/terminal device in embodiments of the present disclosure, such as the first device and the second device, and the computer program instructions cause a computer to perform the corresponding processes implemented by the mobile terminal/terminal device (such as the first device and the second device) in various methods according to embodiments of the present disclosure, which are not repeated herein for brevity.

Some embodiments of the present disclosure also provide a computer program.

In some embodiments, the computer program may be applied to the network device in embodiments of the present disclosure, and the computer program instructions cause a computer to perform the corresponding processes implemented by the network device in various methods according to embodiments of the present disclosure, which are not repeated herein for brevity.

In some embodiments, the computer program may be applied to the mobile terminal/terminal device in embodiments of the present disclosure, such as the first device and the second device, and the computer program instructions cause a computer to perform the corresponding processes implemented by the mobile terminal/terminal device (such as the first device and the second device) in various methods according to embodiments of the present disclosure, which are not repeated herein for brevity.

Those skilled in the art may realize that the units and algorithm operations of each example described in combination with some embodiments described herein may be implemented by an electronic hardware, or a combination of a computer software and an electronic hardware. Whether these functions are implemented in a hardware or a software depends on a specific application and a design constraint of the technical solutions. A professional and technical personnel may use different methods for each specific application to implement the described functions, but such implementation should not be considered beyond the scope of the present disclosure.

Those skilled in the art may clearly understand that for the convenience and conciseness of the description, the specific working process of the systems, apparatuses and units described above may refer to the corresponding operations in the above method embodiments, and are not repeated here.

In several embodiments provided herein, it should be understood that the disclosed systems, apparatuses, and methods may be implemented in other ways. For example, the device embodiments described above are merely illustrative. For example, the division of the above units is only a logical function division. In actual implementation, there may be another division manner. For example, multiple units or components may be combined or integrated into another system, or some features can be ignored or not executed. In addition, the mutual coupling or direct coupling or communication connection shown or discussed may be an indirect coupling or communication connection through some interfaces, devices or units, and may be electrical or in other forms.

The units described above as separate components may or may not be physically separated, and the components illustrated as units may or may not be physical units. The units may be located in one place, or may be distributed to multiple network units. Some or all of the units may be selected according to actual needs to achieve the purpose of a solution of the embodiments.

In addition, each functional unit in each embodiment of the present disclosure may be integrated into one processing unit, or each unit may exist physically separately. Optionally, two or more units may also be integrated into one unit.

The above-described integrated unit may be stored in a computer-readable memory if the integrated unit is implemented in the form of a software functional module and sold or used as a standalone product. Based on such understanding, the technical solution of the present disclosure, in essence or the contribution to the prior art, or all or part of the technical solution may be embodied in the form of a software product. The software product may be stored in a memory. The software product may include a number of instructions causing a computer device (the computer device may be a personal computer, a server or a network device, and the like) to perform all or parts of the operations of the above-described methods of various embodiments of the present disclosure. The foregoing memory may include various media which are able to store program codes. The media may include a U disk, a Read-Only Memory (ROM), a Random Access Memory (RAM), a removable hard disk, a magnetic disk, an optical disk, and the like.

The above description is only some embodiments of the present disclosure, but the protection scope of the present disclosure is not limited to this. Changes or replacements that are easily thought of by those skilled in the art should be covered in the protection scope of the present disclosure. Therefore, the protection scope of the present disclosure shall be subject to the protection scope of the claims.

What is claimed is:

1. A wireless communication method, comprising:

determining, by a first terminal, a target transmitting power at which the first terminal transmits a back-scattering signal based on first information, wherein the first information comprises a first power offset parameter, and at least one of:

a receiving power of a first signal, wherein the first signal is sent from a network device, and the first terminal is configured to be powered by the first signal and/or to generate the back-scattering signal;

a target receiving power expected by a receiving end of the back-scattering signal;

a power control command; and a back-scattering loss, wherein the first power offset parameter comprises a power offset parameter related to at least one of:

a transmitting end of a power signal;

a transmitting end of a carrier signal, wherein the carrier signal is sent from the network device, and the first terminal is configured to modulate the carrier signal to generate the back-scattering signal;

a receiving end of the back-scattering signal; and a communication mode;

wherein different sources of power signals correspond to different first power offset parameters, different sources of carrier signals correspond to different first power offset parameters, and different communication modes correspond to different first power offset parameters.

2. The method according to claim 1, wherein the determining, by a first terminal, a target transmitting power at which the first terminal transmits a back-scattering signal based on first information comprises:

determining, by the first terminal, a path loss based on the receiving power of the first signal; and determining the target transmitting power for transmitting the back-scattering signal based on the path loss.

3. The method according to claim 2, wherein the determining the target transmitting power for transmitting the back-scattering signal based on the path loss comprises:

determining, by the first terminal, the target transmitting power for transmitting the back-scattering signal based on the path loss and the target receiving power.

4. The method according to claim 3, wherein the determining, by the first terminal, the target transmitting power for transmitting the back-scattering signal based on the path loss and the target receiving power comprises:

determining the target transmitting power for transmitting the back-scattering signal based on the path loss, the target receiving power, and the first power offset parameter.

5. The method according to claim 1, wherein the first power offset parameter further comprises at least one of:

a compensation factor for a path loss;

a power offset parameter related to a carrier signal, the carrier signal being sent from the network device, the first terminal being configured to modulate the carrier signal to generate the back-scattering signal;

a power offset parameter related to the back-scattering signal; and a power offset parameter related to a communication mode.

6. The method according to claim 5, wherein the power offset parameter related to the carrier signal comprises at least one of:

a power offset parameter related to a time-domain resource of the carrier signal; and a power offset parameter related to a frequency-domain resource of the carrier signal.

7. The method according to claim 5, wherein the power offset parameter related to the back-scattering signal comprises at least one of:

a power offset parameter related to a time-domain resource of the back-scattering signal;

a power offset parameter related to a frequency-domain resource of the back-scattering signal;

a power offset parameter related to a rate of information carried in the back-scattering signal; and a power offset parameter related to a modulation mode of the back-scattering signal.

8. The method according to claim 1, further comprising:

determining, by the first terminal, a power offset parameter that is used to calculate the target transmitting power of the back-scattering signal, based on a transmitting end of the first signal and/or a target receiving end of the back-scattering signal.

9. The method according to claim 1, further comprising:

determining, by the first terminal, a target receiving power that is used to calculate the target transmitting power from a plurality of target receiving powers based on the receiving power of the first signal, in response to the first terminal being configured with a plurality of target receiving powers.

10. The method according to claim 9, wherein the determining, by the first terminal, a target receiving power that is used to calculate the target transmitting power from a plurality of target receiving powers based on the receiving power of the first signal comprises:

determining a maximum one of the plurality of target receiving powers as the target receiving power that is used to calculate the target transmitting power, in response to transmitting powers of the back-scattering signal determined based on the plurality of target receiving powers are less than the receiving power of the first signal.

11. The method according to claim 1, further comprising:

determining, by the first terminal, a first power control command based on a power of a third signal transmitted by a second terminal, wherein a target receiving end of the back-scattering signal is the second terminal; and transmitting, by the first terminal, the first power control command to the second terminal, the first power control command being configured to control a transmitting power at which the second terminal transmits a back-scattering signal.

12. The method according to claim 1, wherein the determining, by a first terminal, a target transmitting power at which the first terminal transmits a back-scattering signal based on first information comprises:

determining, by the first terminal, the target transmitting power at which the first terminal transmits the back-scattering signal based on a second power control command transmitted by a second terminal, wherein a target receiving end of the back-scattering signal is the second terminal.

13. The method according to claim 12, wherein the first signal is transmitted by the second terminal.

14. A network device, comprising a processor and a memory, wherein the memory is configured to store a computer program, the processor is configured to call and run the computer program stored in the memory and execute:

transmitting, by the network device, third information to a terminal device to control, based on the third information, a target transmitting power at which the terminal device transmits a back-scattering signal, wherein the third information is used to indicate a first power offset parameter, and at least one of:

a target receiving power expected by a receiving end of the back-scattering signal, and a resource for transmitting the back-scattering signal;

wherein the first power offset parameter comprises a power offset parameter related to at least one of:

a transmitting end of a power signal;

a transmitting end of a carrier signal, wherein the carrier signal is sent from the network device, the terminal device is configured to modulate the carrier signal to generate the back-scattering signal;

a receiving end of the back-scattering signal; and a communication mode;

wherein different sources of power signals correspond to different first power offset parameters, different sources of carrier signals correspond to different first power offset parameters, and different communication modes correspond to different first power offset parameters.

15. The network device according to claim 14, wherein one or more resources for transmitting the back-scattering signal comprises a plurality of resources respectively corresponding to a plurality of target receiving powers.

16. The network device according to claim 14, wherein the first power offset parameter is configured by the network device through a power control command.

17. The network device according to claim 14, wherein the first power offset parameter is transmitted by the network device through a first signal, and the first signal is used to power the terminal device and/or cause the terminal device to generate the back-scattering signal.

18. A wireless communication device, comprising a processor and a memory, wherein the memory is configured to store a computer program, the processor is configured to call and run the computer program stored in the memory and execute:

determining a target transmitting power at which the wireless communication device transmits a back-scattering signal based on first information, wherein the first information comprises a first power offset parameter, and at least one of:

a receiving power of a first signal, wherein the first signal is sent from a network device, and the wireless communication device is configured to be powered by the first signal and/or to generate the back-scattering signal;

a target receiving power expected by a receiving end of the back-scattering signal;

a power control command; and a back-scattering loss, wherein the first power offset parameter comprises a power offset parameter related to at least one of:

a transmitting end of a power signal;

a transmitting end of a carrier signal, wherein the carrier signal is sent from the network device, the wireless communication device is configured to modulate the carrier signal to generate the back-scattering signal;

a receiving end of the back-scattering signal; and a communication mode;

wherein different sources of power signals correspond to different first power offset parameters, different sources of carrier signals correspond to different first power offset parameters, and different communication modes correspond to different first power offset parameters.

* * * * *